US011468225B2

(12) United States Patent
Alexeev et al.

(10) Patent No.: US 11,468,225 B2
(45) Date of Patent: *Oct. 11, 2022

(54) DETERMINING FUNCTIONAL AND DESCRIPTIVE ELEMENTS OF APPLICATION IMAGES FOR INTELLIGENT SCREEN AUTOMATION

(71) Applicant: Kapow Technologies, Horsholm (DK)

(72) Inventors: Vadim Alexeev, Saint-Petersburg (RU); Benjamin De Coninck Owe, Copenhagen (DK)

(73) Assignee: KOFAX, INC., Irvine, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/096,587

(22) Filed: Nov. 12, 2020

(65) Prior Publication Data

US 2021/0064674 A1     Mar. 4, 2021

Related U.S. Application Data

(63) Continuation of application No. 16/365,525, filed on Mar. 26, 2019, now Pat. No. 10,866,997.

(60) Provisional application No. 62/648,305, filed on Mar. 26, 2018.

(51) Int. Cl.
| | |
|---|---|
| *G06V 30/00* | (2022.01) |
| *G06F 40/143* | (2020.01) |
| *G06F 16/951* | (2019.01) |
| *G06N 3/08* | (2006.01) |

(Continued)

(52) U.S. Cl.
CPC .......... *G06F 40/143* (2020.01); *G06F 16/951* (2019.01); *G06F 40/14* (2020.01); *G06N 3/08* (2013.01); *G06V 30/412* (2022.01)

(58) Field of Classification Search
CPC .. G06K 9/20; G06K 9/56; G06K 9/48; G06K 9/481; G06K 9/6446; G06K 9/222; G06K 9/4604; G06K 11/04; G06K 15/00; G06N 3/08; G06F 16/951; G06F 3/0487;
(Continued)

(56) References Cited

U.S. PATENT DOCUMENTS 5,819,288 A * 10/1998 De Bonet ........... G06F 16/5838
7,855,811 B2 * 12/2010 Silverbrook ........... G06Q 30/02
358/403

(Continued)

*Primary Examiner* — Amir Alavi
(74) *Attorney, Agent, or Firm* — Zilka-Kotab, P.C.

(57) ABSTRACT

The presently disclosed inventive concepts are directed to systems, computer program products, and methods for intelligent screen automation. The inventive computer program products include program instructions configured to cause a computer, upon execution thereof, to perform a method including: identifying, from among a plurality of elements within one or more images of a user interface, a first set of elements and a second set of elements, wherein the first set of elements and the second set of elements each independently comprise either or both of: textual elements, and non-textual elements; determining one or more logical relationships between the textual elements and the non-textual elements; building a hierarchy comprising some or all of the first set of elements and some or all of the second set of elements, wherein building the hierarchy forms a data structure representing functionality of the user interface; and outputting the data structure to a memory.

20 Claims, 23 Drawing Sheets

(51) Int. Cl.
*G06F 40/14* (2020.01)
*G06V 30/412* (2022.01)

(58) Field of Classification Search
CPC . G06F 17/2247; G06T 7/0083; G06T 7/0081; G06V 30/412
See application file for complete search history.

(56) References Cited

U.S. PATENT DOCUMENTS

| | | | |
|---|---|---|---|
| 8,511,565 B2* | 8/2013 | Lapstun | G06F 16/951 |
| | | | 235/487 |
| 8,769,438 B2* | 7/2014 | Mangum | G06F 3/0485 |
| | | | 715/784 |
| 9,128,995 B1* | 9/2015 | Fletcher | H04L 41/5038 |
| 9,870,629 B2* | 1/2018 | Cardno | G06Q 30/02 |
| 10,579,508 B2* | 3/2020 | Conversy | G06F 11/3664 |
| 10,866,997 B2* | 12/2020 | Alexeev | G06V 10/34 |
| 2005/0198617 A1* | 9/2005 | Kim | G06F 40/143 |
| | | | 717/109 |
| 2008/0177782 A1* | 7/2008 | Poston | G06F 40/197 |
| | | | 707/999.102 |
| 2010/0218100 A1* | 8/2010 | Simon | G06F 16/4393 |
| | | | 715/731 |
| 2011/0138340 A1* | 6/2011 | Holm-Petersen | G06Q 10/06 |
| | | | 715/854 |

* cited by examiner

DETERMINING FUNCTIONAL AND DESCRIPTIVE ELEMENTS OF APPLICATION IMAGES FOR INTELLIGENT SCREEN AUTOMATION

FIELD OF INVENTION

The present invention relates to application management via image processing. In particular, the present invention relates to processing digital images provided by an application interface to determine the underlying functionality of various elements displayed in/on the digital images and enable automated interaction with the application interface.

BACKGROUND OF THE INVENTION

Certain applications and services offered via the Internet operate based on a host system providing image(s) of an application/website interface or screen to a client system, rather than providing a fully functional interface or screen with which the client (specifically a user thereof) may directly interact. Instead, actions taken by the user (typically represented by timing information and position of mouse clicks and/or keystrokes) are translated by the client and provided to the host, which then implements the corresponding functionality of the website/interface on the host system. Exemplary applications employing such a scheme include many remote desktop control applications and various provided/delivered via CITRIX®, Java, virtual machines, etc.

Three exemplary types of applications/systems employ different schemes presenting difficulties with respect to determining functional and descriptive elements of an image of an interface using automated scripts/entities. As noted above, applications that provide only an image and control of I/O via devices such as the mouse and keyboard such as CITRIX®, but also certain web elements represented in HTML5 Canvas, WebGL, Flash, Silverlight, and certain Java applications represent a first type. Applications that provide user interface (UI) structural information, but where access to the underlying structures have high latency (e.g. on the order of several seconds per request/interaction) such as system, applications, and products (SAP) applications form a second type. Applications that provide UI structural information, but exhibit a particularly complex and/or continuously mutating structure, such as a document object model (DOM) tree structure of many modern browsers form a third type.

While this conventional approach provides benefits in the form of reduced network bandwidth (since the host need only transmit image(s) of the interface over time rather than also providing the underlying functionality and any necessary supporting hardware/software via the network), enabling non-compliant/conforming APIs to be effectively utilized with a particular operating system (OS) or environment, and providing added security by preventing direct access to host system functionality, it comes with the consequence of being unable to consistently and accurately determine and invoke the various elements and functionality thereof by an automated script or entity such as a "web robot."

Instead, and by design these image-based interfaces are easily interpretable by a human user just by recognizing certain content, or reading text on the image to discern context of various elements using subjective criteria and natural processes. However, conventional computers are not well-suited to this type of pattern recognition task, as the subjective criteria and natural processes employed by a human to discern various elements of the image are not capable of being reduced to a set of program instructions replicating humans' pattern recognition capability.

One conventional approach to simulate the functionality of the application/interface, involves tracking I/O events by position and timing to determine the precise area(s) of the interface with which the user interacted, as well as what form those interactions took (e.g. left mouse button click, right mouse button click, double click, click-and-hold, hover, fly-over, gesture, keystroke, etc.). While images of interfaces conveniently follow certain conventions, such as all elements being substantially aligned to a vertical/horizontal grid system defined by pixels of the displayed image, slight changes in pixelation and/or interaction location often prevent proper invocation of the desired functions of the various interface elements.

Another conventional approach involves the use of standard exemplar images (e.g. templates) of website/application interfaces, and attempting to match a given image to one of the standard exemplars, deriving element and functionality information about the interface represented by the given image from the closest-matching exemplar. However, again these approaches are sensitive to pixelation and compression algorithms and essentially preclude the use of automated scripts/entities to interact with the image-based interface. In addition, using such conventional approaches requires a user to identify the image/interface for which template matching should be attempted, and this requirement for user intervention acts as a bottleneck in the automation process.

Therefore, it would be highly beneficial to provide new techniques, systems and/or computer program product technology for processing image-based application/website interfaces/screens to automatically determine the various elements and corresponding functionalities thereof, as well as build and provide a description or model of said interface/screen that is capable of being used by an automated script to interact with the interface/screen and perform any available functionality thereof.

SUMMARY OF THE INVENTION

According to one embodiment, a computer program product for determining functional and descriptive elements of application and interface images includes a computer readable storage medium having program instructions configured to cause a computer, upon execution thereof, to perform a method including: identifying, from among a plurality of elements within one or more images of a user interface, a first set of elements and a second set of elements, wherein the first set of elements and the second set of elements each independently comprise either or both of: textual elements, and non-textual elements; determining one or more logical relationships between the textual elements and the non-textual elements; building a hierarchy comprising some or all of the first set of elements and some or all of the second set of elements, wherein building the hierarchy forms a data structure representing functionality of the user interface; and outputting the data structure to a memory.

Of course, the foregoing embodiments are to be understood as merely exemplary illustrations of the presently disclosed inventive concepts. Additional embodiments, features, functions, and advantages will become apparent from reviewing the disclosures in conjunction with the Figures presented herewith.

DETAILED DESCRIPTION

Figure 1:
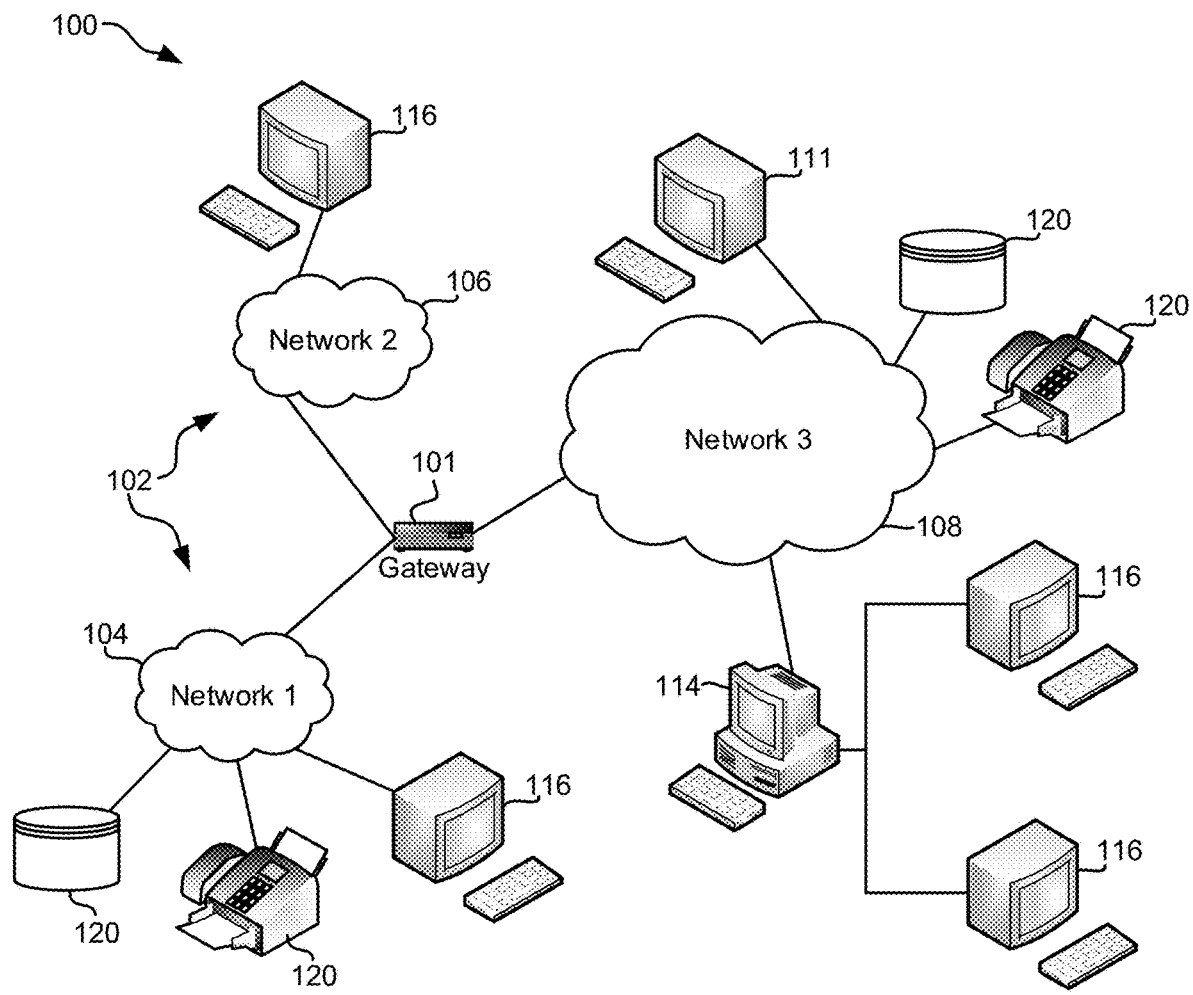
FIG. 1 illustrates a network architecture, in accordance with one aspect of the present disclosure.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The present application generally regards automated image/interface processing, and addresses the problems associated with determining descriptive and functional elements of an application interface to provide a model according to which an automated script/entity may process the image/interface.

Definitions/Glossary of Terms

It must also be noted that, as used in the specification and the appended claims, the singular forms "a," "an" and "the" include plural referents unless otherwise specified.

The present application refers to "websites" and "applications" interchangeably, and these terms should be understood as including any visually renderable form of information capable of being displayed by a computer using, e.g., a host/client arrangement or other arrangement in which the user interface structure and underlying functionality are hidden or otherwise inaccessible to a user interacting with an image-based interface such as several modern browser applications or applications that do not expose the structure of their interface such as those implemented in Java. Websites and applications of particular interest in the context of the presently disclosed inventive concepts include one or more interfaces provided in the form of one or more images displayed by a client device. The images lack underlying structured information detailing the functionality and components of the interface that are accessible by the host device providing the images to the client.

"Interfaces" include any graphical representation of information capable of being displayed by a computer and including a plurality of elements each having a corresponding functionality, or providing a particular description of other elements of the interface.

"Elements" include any distinct/discreet portion(s) of an image or interface, whether functional or descriptive, and may be provided in the form of graphical elements, textual elements, descriptive elements, functional elements, subregions, and any other type of "element" described herein, such as images, graphics, containers, fields/cells, textual elements, tables, fields, buttons, icons, drop-down lists, combo boxes, menus, check boxes, and radio buttons, lines (preferably horizontal and/or vertical line segments) and intersections therebetween, etc. as would be understood by a person having ordinary skill in the art upon reading the present disclosure.

Elements may be present in a nested structure, e.g. a particular hierarchy of elements that may be represented in a tree structure or other hierarchical logical arrangement. For example, a container may contain other container(s), generic rectangular elements, one or more tables, one or more icons, one or more buttons, one or more descriptive and/or functional textual elements, etc. The table(s) may include textual elements, images, icons, or any other suitable type of content within various field(s) thereof. Similarly the icons and/or buttons may include graphical and/or textual elements. Skilled artisans will appreciate, upon reviewing these descriptions, that any level and/or structure of nested elements may be implemented without departing from the scope of the present disclosure.

"Candidate elements" are to be understood as potential members of a set consisting of a particular type of element, e.g. as set forth above.

"Descriptive elements" include any type of element that is non-functional. In other words, descriptive elements do not have any functionality associated therewith, and merely describe (whether via words, pictures, symbols, colors, or any other graphical manner) the image or interface (or portion thereof) in which the descriptive element(s) are depicted. Although descriptive elements refer to non-functional elements, it should be understood that descriptive elements, in various embodiments, include nested functional elements. For example, a button may include a descriptive element in the form of a shape such as a rectangle defining the boundaries of the button, but may also include textual element(s) describing the button and/or function associated therewith. Where a descriptive element includes or encompasses a functional element, the descriptive element shall be understood to refer exclusively to the non-functional portion of the overall element structure.

"Functional elements" as described herein refer to elements of an image or interface that are associated with an underlying function of the application represented by the image/interface. Functional elements may include textual elements and/or graphical elements, interchangeably or in combination. Exemplary functions include any type of response to input received from the client/user and/or output from the host/application. Exemplary functions include: receipt of a data entry; a submission of a received data entry; an activation and/or toggling of a selectable element such as a button or radio button; a display of options available via a combo box, drop-down list, menu, etc.; a loading of a new image or interface such as via a hyperlink, button, icon, or the like as described herein; etc. as would be understood by a person having ordinary skill in the art upon reading the present descriptions.

The term "textual element" shall be understood as referring specifically to elements consisting of alphanumeric and/or other symbols, whether linguistic, mathematical, or otherwise. Textual elements are generally represented by one or more characters and associated formatting (e.g. underline, strikethrough, bold, font, font size, alignment, spacing, foreground color, background color, etc.) displayed on an image or interface. Textual elements may be interactive, such as hyperlinks, or non-interactive, such as plain text displayed for purposes of description/information provision. Textual elements may be independent elements of a given image/interface, or may be associated with other elements of an image/interface. For example, text may be represented within a field, a button, an icon, a container, etc. in various approaches, although preferably icons do not include textual elements. Textual elements are also characterized by a substantially bicolor profile, with one color corresponding to the "foreground" (and usually representing the characters of the text) while the other color corresponds to the background upon which the character(s) are represented in the image.

The term "graphical element" shall be understood as referring to any non-textual element of an image or interface. Graphical elements may be interactive (e.g. functional) or non-interactive (e.g. descriptive), may correspond to foreground and/or background of an image or interface, and may include types of elements. For example, while a graphical element refers to non-textual elements, such as the grid structure of a table, graphical elements may include or have nested therein textual elements, such as the values of different cells of the aforementioned table. Similarly, elements such as icons, buttons, logos, pictures, graphics, containers, menus, combo boxes, drop down lists, etc. as described herein may include text and graphical elements, e.g. textual foreground elements depicted on a graphical background element.

As utilized herein, the term "container" shall be understood as referring to any subregion of an image or interface. Preferably, containers are substantially rectangular subregions of an image or interface, and correspond to a particular feature of the image or interface, such as a header, a footer, one or more side regions (e.g. a side menu), an internal subregion such as a logo, picture, graphic, text block, etc. as would be understood by a person having ordinary skill in the art upon reading the present descriptions. Containers may be and/or include elements, and may include nested elements within elements, according to combinable implementations of the presently disclosed inventive concepts.

The term "icon" shall be understood as including any small, substantially square graphical element displayed on an interface. Icons may or may not include text, but if including text do so in the form of a graphic representing one or more characters, and/or represent the text in addition to other graphical elements. Icons may be interactive or non-interactive, in various embodiments. Icons may be distinguished from textual elements in that the color profile of an icon often includes more than two colors.

The term "generic rectangular element" shall be understood as referring to an element having a substantially rectangular shape, and may include and/or encompass other types of elements defined herein, such as containers, tables, icons, textual elements, functional elements, fields, buttons, radio buttons, check boxes, labels, etc. as described herein, along with equivalents of the disclosed types of elements that would be appreciated by a person having ordinary skill in the art upon reading the present descriptions.

The term "table" shall be understood as referring to an element including a plurality of fields arranged in a grid-like structure. Tables may include the lines defining the grid, as well as values input into various cells of the table. Tables may include cells configured to accept/display textual information, and/or may include interactive elements such as drop-down menus, check boxes, combo boxes, radio buttons, and the like as described herein and in accordance with several exemplary implementations.

The term "field" (or equivalently "cell") shall be understood as including any distinct portion of a table, form, or the like. "Field" may refer to a single-cell table (i.e. a 1×1 table) in some implementations. Fields are interactive elements that preferably include or accept textual elements as input values. In several instances, fields may include or be check boxes, combo boxes, menus, and/or drop-down lists.

The term "button" shall be understood as any element other than a hyperlink that is functional and whose associated function is triggered via a mouse click, tap, gesture, or other non-keystroke input, or designated "selection" keystroke, such as a "spacebar" keystroke, "enter" keystroke, or "return" keystroke. In preferred implementations, buttons include at least graphical element(s), and may optionally include textual elements. Where textual elements are included, the textual elements are preferably non-functional, such that interaction with any portion of the button triggers the associated function.

The term "radio button" shall be understood as defined in the art as of the present application's filing date. Generally, radio buttons may include any type of button or selectable element with multiple possible options that are selectable in a mutually exclusive fashion. In a preferred embodiment, radio buttons are rendered as a series of selectable elements such as check boxes, circles, etc. and associated textual labels.

The term "check box" is understood as any functional element that is not a radio button and has a binary state capable of being toggled via user interaction with the check box. In preferred approaches, check boxes are represented by small, square graphical elements, but check boxes may include circular graphical elements, or any other shape of element meeting the foregoing criteria.

The term "label" as referenced herein shall be understood to include descriptive elements associated with a functional element or another descriptive element. Labels may also take the form of metadata associated with one or more elements of an interface or image. For example, labels may include descriptions of the content of the label, the function of the functional element with which the label is associated, positional information regarding the element with which the label is associated, a hyperlink, a textual element associated with (e.g. displayed in close proximity to) a graphical element, etc. in various combinations. Labels therefore may, but need not necessarily, be visible to a user interacting with the image/interface representing the underlying application.

In accordance with the foregoing definitions, and except as otherwise expressly precluded therein, it shall be understood that the various types of elements of images and interfaces may be present in any suitable combination, without departing from the scope of the inventive concepts presently described. Likewise, various types of elements may be implemented in any suitable permutation of the foregoing exemplary element types and equivalents thereof. Preferably, images and/or interfaces are characterized by a hierarchical, logical organization of elements that may be represented by a tree or equivalent logical structure.

General Embodiments

According to one embodiment, a computer-implemented method for determining functional and descriptive elements of application and interface images includes: identifying a first set of elements within one or more images of a user interface, wherein each of the first set of elements is independently selected from the group consisting of: vertical lines, horizontal lines, and rectangular elements; identifying a second set of elements within the one or more images, wherein each of the second set of elements is independently selected from the group consisting of: radio buttons, icons, and textual elements; determining one or more logical relationships between the textual elements and non-textual elements of the image; building a hierarchy comprising some or all of the first set of elements and some or all of the second set of elements in order to form a tree-based data structure representing functionality of the user interface; and outputting the tree-based data structure to a memory.

According to another embodiment, a computer program product for determining functional and descriptive elements of application and interface images includes a computer readable storage medium having program instructions embodied therewith, the program instructions readable and/or executable to cause a processor to perform a method. The method includes: identifying, using the processor, a first set of elements within one or more images of a user interface, wherein each of the first set of elements is independently selected from the group consisting of: vertical lines, horizontal lines, and rectangular elements; identifying, using the processor, a second set of elements within the one or more images, wherein each of the second set of elements is independently selected from the group consisting of: radio buttons, icons, and textual elements; determining, using the processor, one or more logical relationships between the textual elements and non-textual elements of the image; building, using the processor, a hierarchy comprising some or all of the first set of elements and some or all of the second set of elements in order to form a tree-based data structure representing functionality of the user interface; and outputting the tree-based data structure to a memory.

According to yet another general embodiment, a system for determining functional and descriptive elements of application and interface images includes a processing circuit and logic integrated with, executable by, or integrated with and executable by the processing circuit to cause the processing circuit to: identify, using the processing circuit, a first set of elements within one or more images of a user interface, wherein each of the first set of elements is independently selected from the group consisting of: vertical lines, horizontal lines, and rectangular elements; identify, using the processing circuit, a second set of elements within the one or more images, wherein each of the second set of elements is independently selected from the group consisting of: radio buttons, icons, and textual elements; determine, using the processing circuit, one or more logical relationships between the textual elements and non-textual elements of the image; build, using the processing circuit, a hierarchy comprising some or all of the first set of elements and some or all of the second set of elements in order to form a tree-based data structure representing functionality of the user interface; and output the tree-based data structure to a memory.

Of course, additional and/or alternative embodiments, functions, and features described herein may be employed in any combination or permutation without departing from the scope of the presently described inventive concepts.

General Mobile Networking and Computing Concepts

Of course, the various embodiments set forth herein may be implemented utilizing hardware, software, or any desired combination thereof. For that matter, any type of logic may be utilized which is capable of implementing the various functionality set forth herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
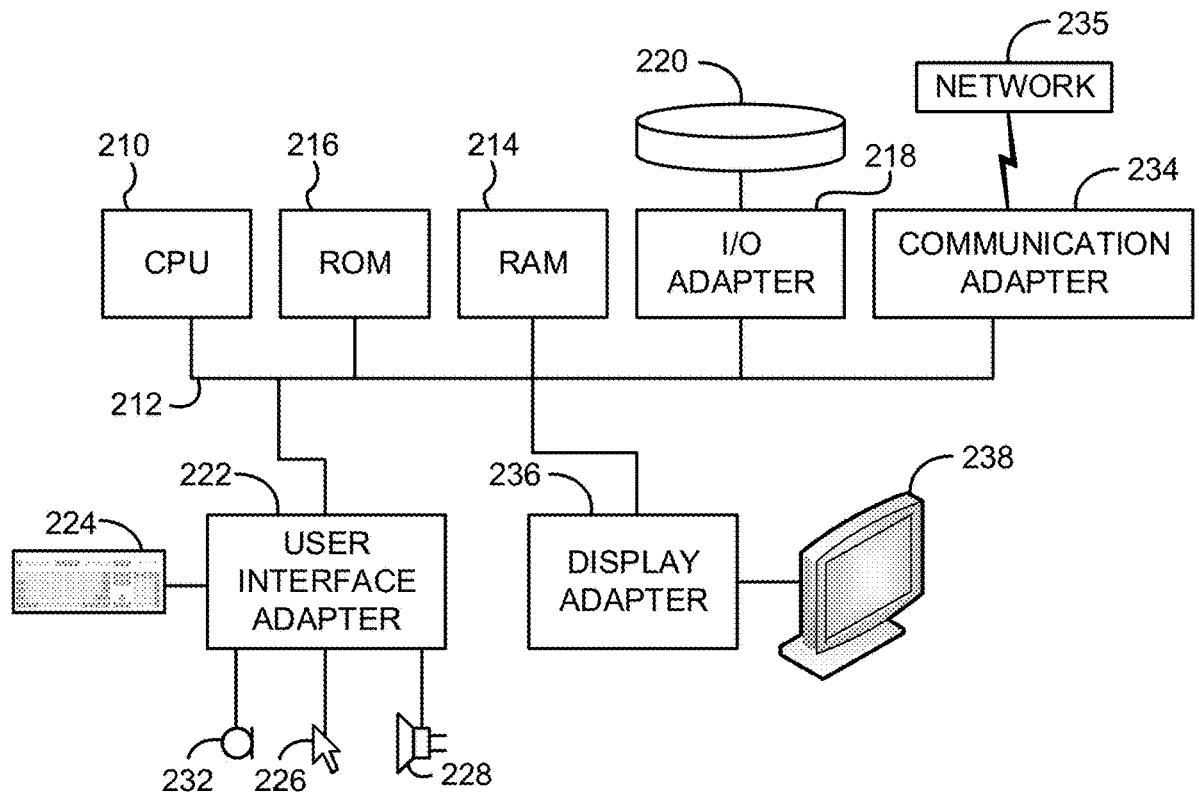
FIG. 2 shows a representative hardware environment that may be associated with the servers and/or clients of FIG. 1, in accordance with another aspect of the present disclosure.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

The presently disclosed methods, systems, and/or computer program products may be utilized with, implemented in, and/or include one or more user interfaces configured to facilitate performing any functionality disclosed herein, such as an image processing mobile application, a case management application, and/or a classification application, in multiple instances.

It will further be appreciated that embodiments presented herein may be provided in the form of a service deployed on behalf of a customer to offer service on demand.

Determining Elements of Application Images and Interfaces

In general, the presently disclosed inventive concepts encompass determining various elements, especially functional and descriptive elements, of application images and interfaces for intelligent automation. Accordingly, the presently disclosed inventive concepts include automated image/interface processing, and addresses the problems associated with determining descriptive and functional elements of an application interface to provide a model according to which an automated script/entity may process the image/interface.

Figure 3:
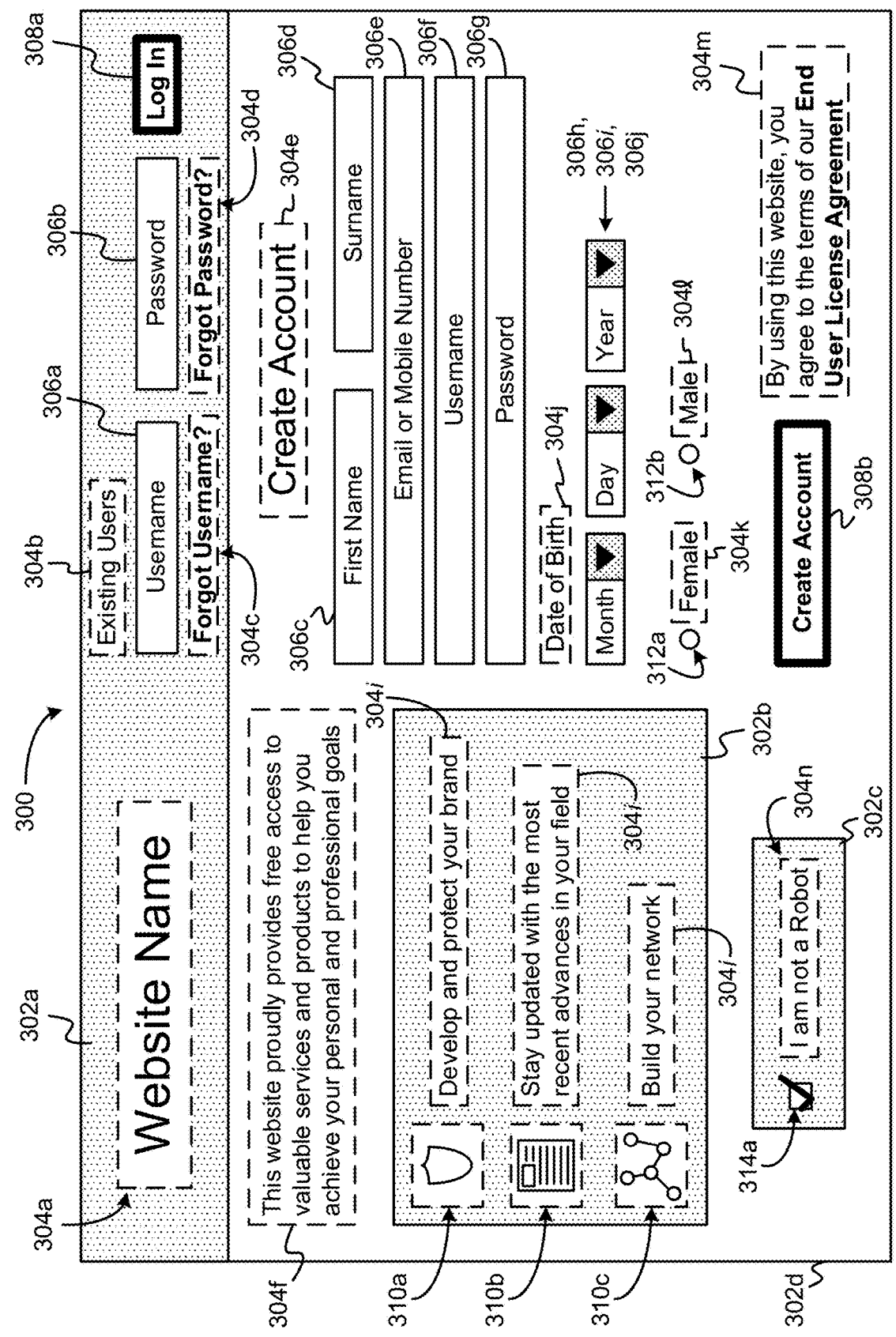
FIG. 3 shows a simplified schematic of a website or application screen with various elements, including containers, textual elements, fields, buttons, icons, radio buttons, and check boxes, according to one implementation of the inventive concepts described herein.

Turning now to FIG. 3, and according to one exemplary embodiment a simplified schematic of a website or application screen is shown. The website/application screen is provided to a user in the form of an image or series of images (equivalently "frames") depicting an image/interface 300 with which the user may interact using typical I/O devices and techniques of any suitable type known by those having ordinary skill in the art at the time of the present application's priority date.

Notably, the image/interface 300 differs from a typical interface implemented on a client computer in that the image/interface 300 as displayed on the client computer display is not a functional interface, but rather an image of an interface, e.g. an interface being hosted by a host computer and transmitted over a network, including a network as shown and described with respect to FIGS. 1 and 2 above. In more approaches, the image/interface may be provided by a single computer, but in all cases the critical limitation is that the user (and/or client computer) do not have direct access to the functions of the image/interface 300. Other examples include applications running in separate windows on a same computer; and applications running on a same computer, but hosted/implemented via a virtual machine.

Skilled artisans will appreciate that image/interface 300 may correspond to a website, a web application, a standalone application, or any other suitable embodiment. The image/interface 300 may include any combination or permutation of exemplary elements as shown in FIG. 3, according to any suitable arrangement thereof, according to various implementations.

With particular reference to the exemplary embodiment of FIG. 3, image/interface 300 includes several containers 302a, 302b, 302c, and 302d. Although the containers of FIG. 3 are shown having a different background than other elements of the image/interface 300, this is not a requirement of the presently disclosed inventive concepts.

Container 302a is essentially a header of the image/interface 300, and includes several descriptive and functional textual elements, fields, and a button. In particular, container 302a comprises descriptive textual elements including an image/interface title/name 304a and a login label 304b. The container 302a also includes two fields, a username field 306a and a password field 306b. Username field 306a has associated therewith a functional textual element 304c for retrieving a username or associated contact information associated with an account, and password field 306b has associated therewith a functional textual element 304d for retrieving/resetting a password associated with an account.

Container 302a also includes button 308a associated with an authentication operation configured to determine eligibility of the account designated in username field 306a and corresponding password designated in password field 306b by submitting the data values entered therein to an authentication engine of the remote system.

The elements described above as being included in container 302a may preferably be represented by a logical structure indicating the dependency and association, if any, between the various elements.

With continuing reference to FIG. 3, interface/image 300 also includes containers 302b and 302c. Container 302b includes several icons 310a, 310b, and 310c and associated labels (e.g. descriptive textual elements) 304i. Container 302c includes check box 314a and associated label (e.g. a descriptive textual element) 304n. Container 302d includes essentially all elements in the rectangular area of the interface excluding the header container 302a.

Interface 300, as shown in FIG. 3, also includes a descriptive textual element 304f generally describing the context of the underlying application. The element 304f acts as a general description of the application/website functionality, and the functions of following icons 310a, 310b, and 310c nested within container 302b.

Container 302c includes a check box 314a and associated label (descriptive textual element) 304n.

Interface 300 also includes a plurality of additional elements which are not necessarily within a given container, but may nonetheless have associations defined therebetween and/or may be associated with unique labels or functions.

For example, to provide additional function to the login functionality described hereinabove with reference to container 302a, account generation functionality may be provided via elements 304e, 304j, 304k, 304l and 304m, as well as fields 306c-306j, radio buttons 312a-312b; and button 308b.

Of course, it shall be understood that the exemplary combination and arrangement of elements as shown in FIG. 3 is provided solely for illustrative purposes, and should not be considered in any way limiting on the scope of the presently disclosed inventive concepts. The image processing and neural networks presented herein are equally applicable to alternative implementations of an image/interface 300 including different combinations and/or arrangements of elements, without limitation.

Figure 4:
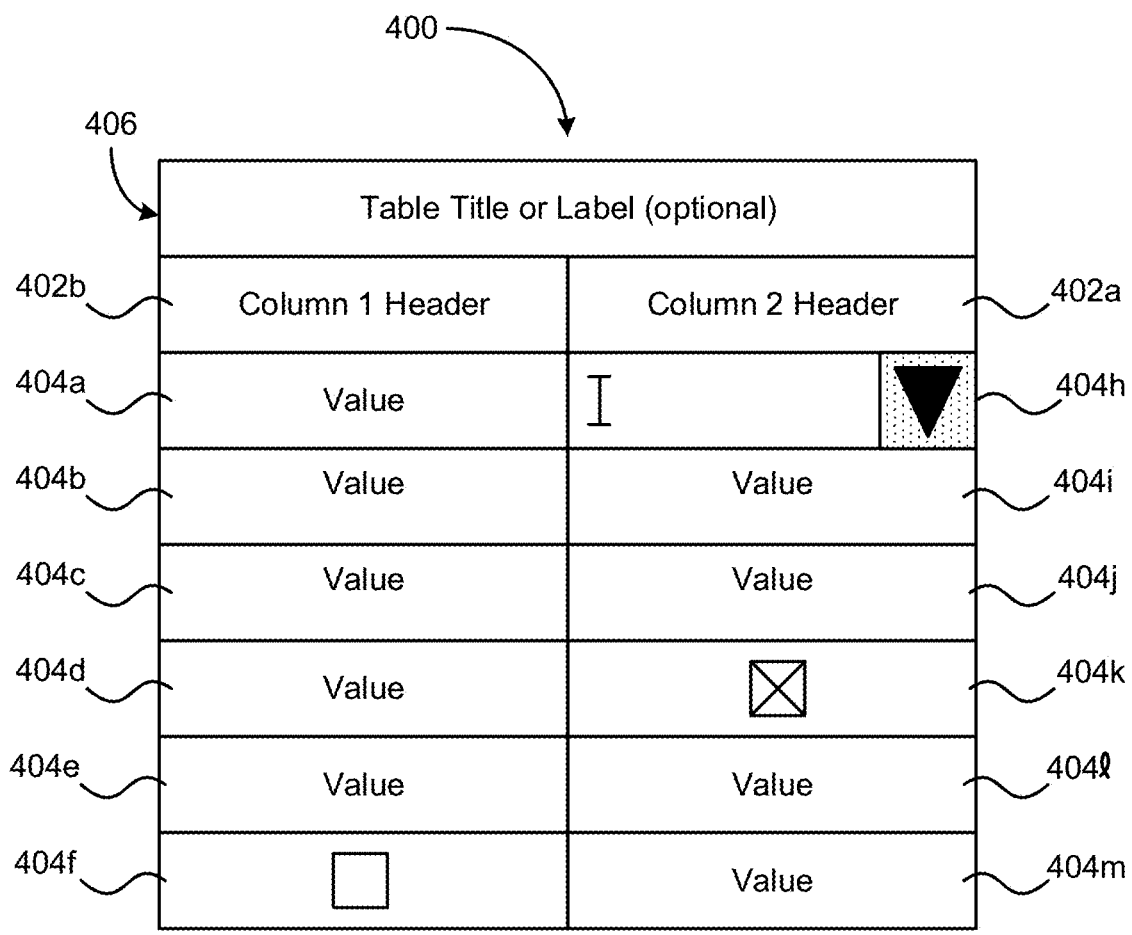
FIG. 4 is an exemplary schematic of a table, according to one aspect of the presently disclosed inventive concepts.
Figure 5A:
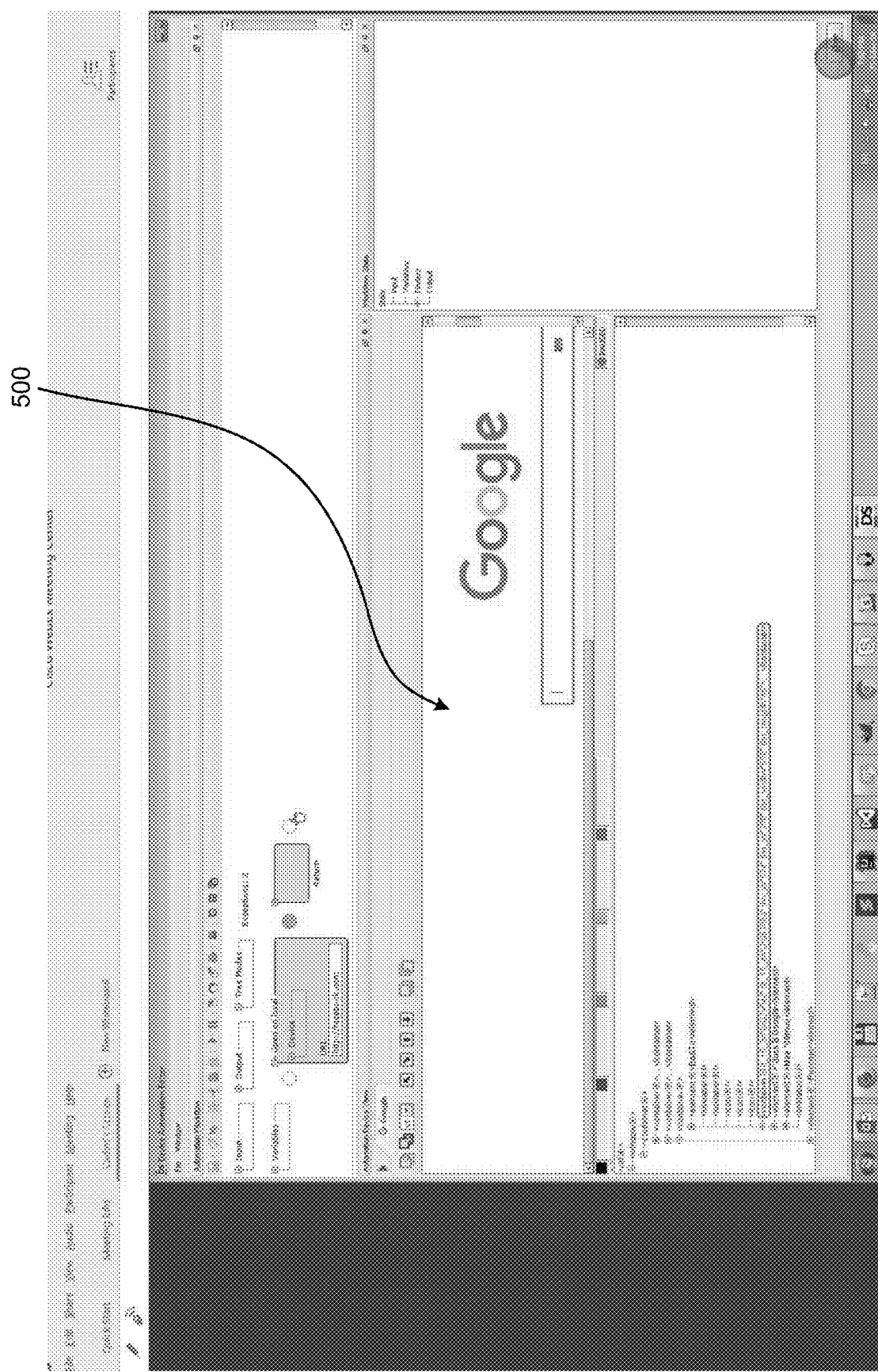
FIGS. 5A-5F are screenshots of an exemplary image/interface and corresponding XML tree structure describing the underlying descriptive and functional elements thereof, according to two illustrative interfaces.
Figure 5B:
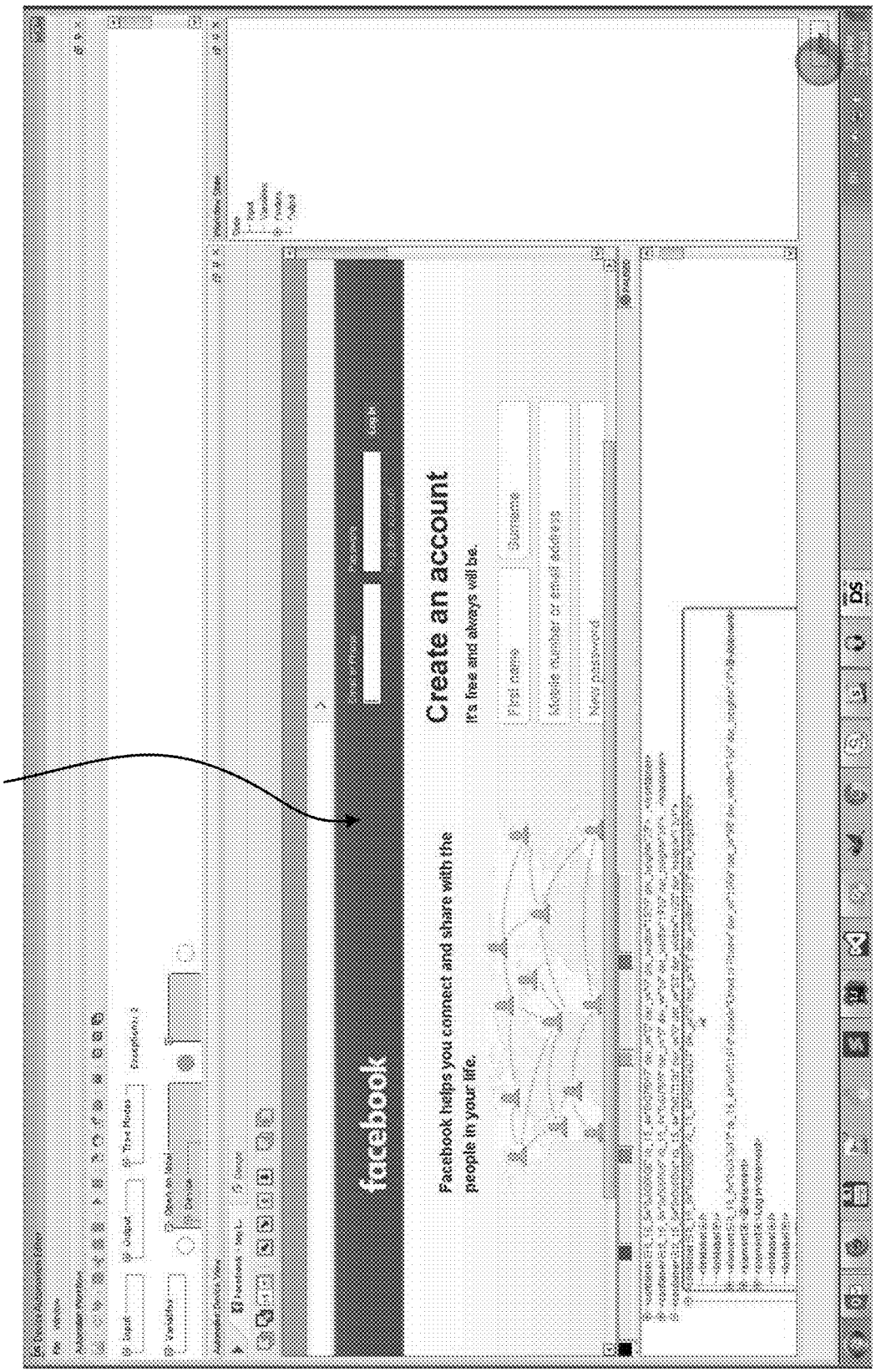
Figure 5C:
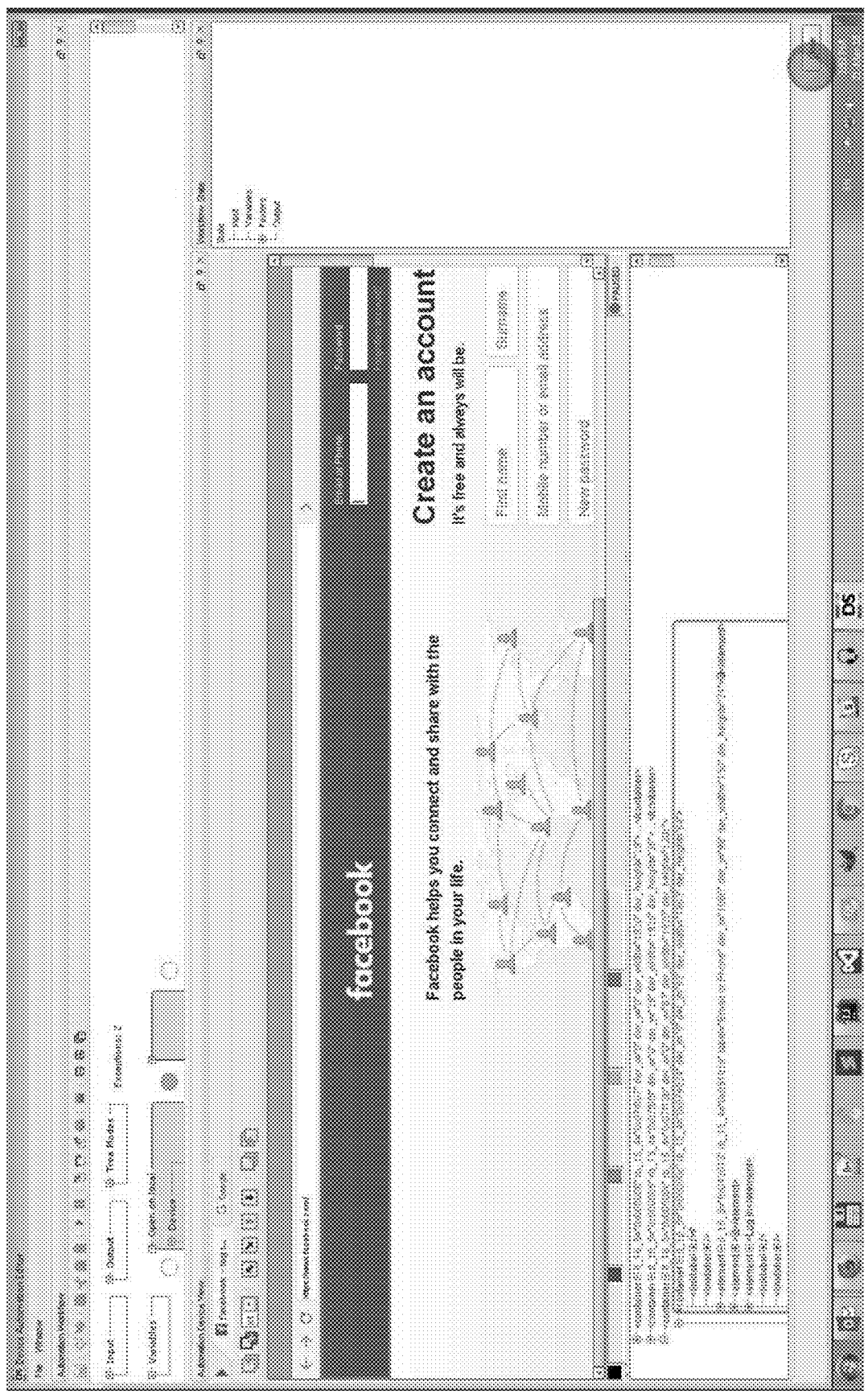
Figure 5D:
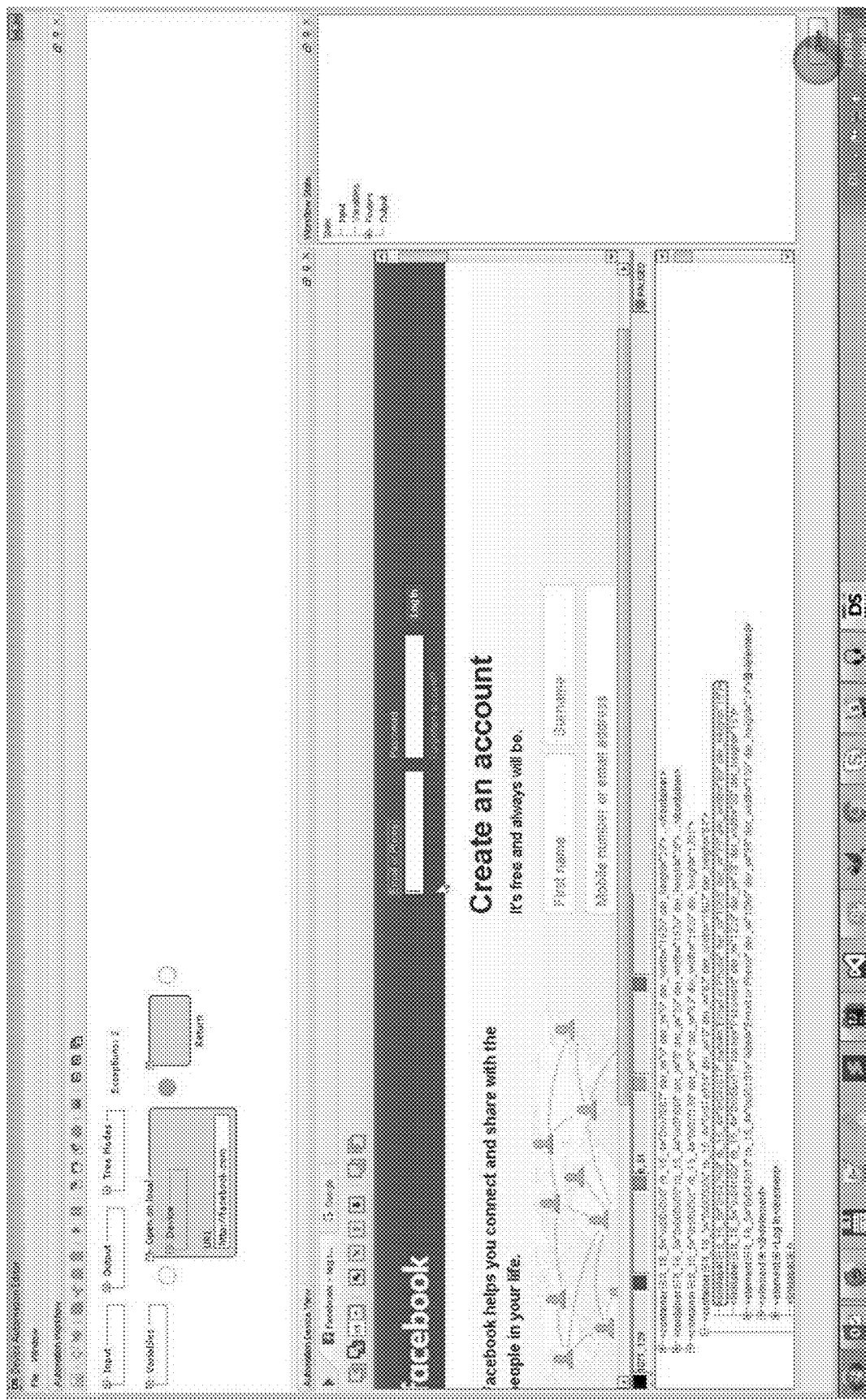
Figure 5E:
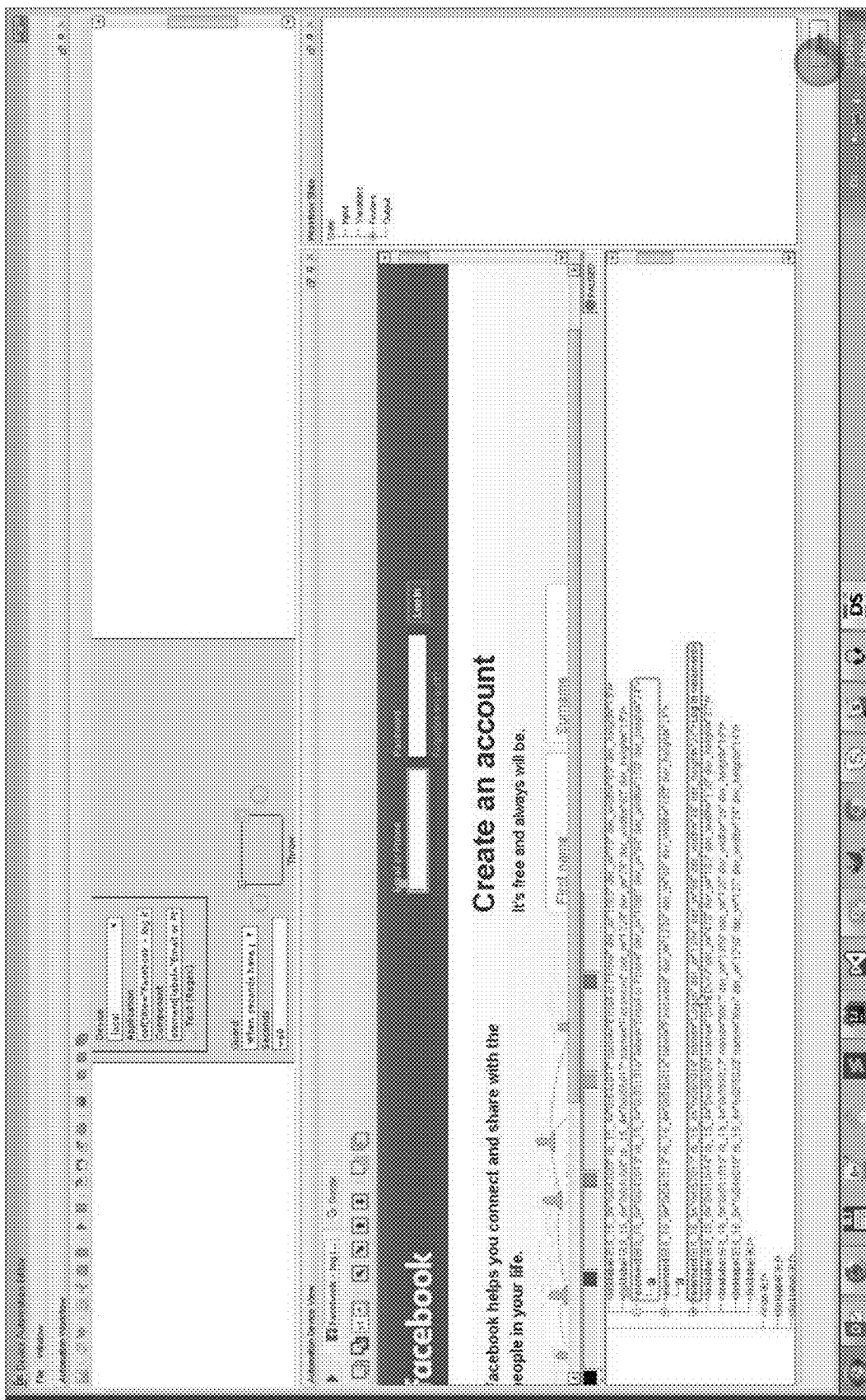
Figure 5F:
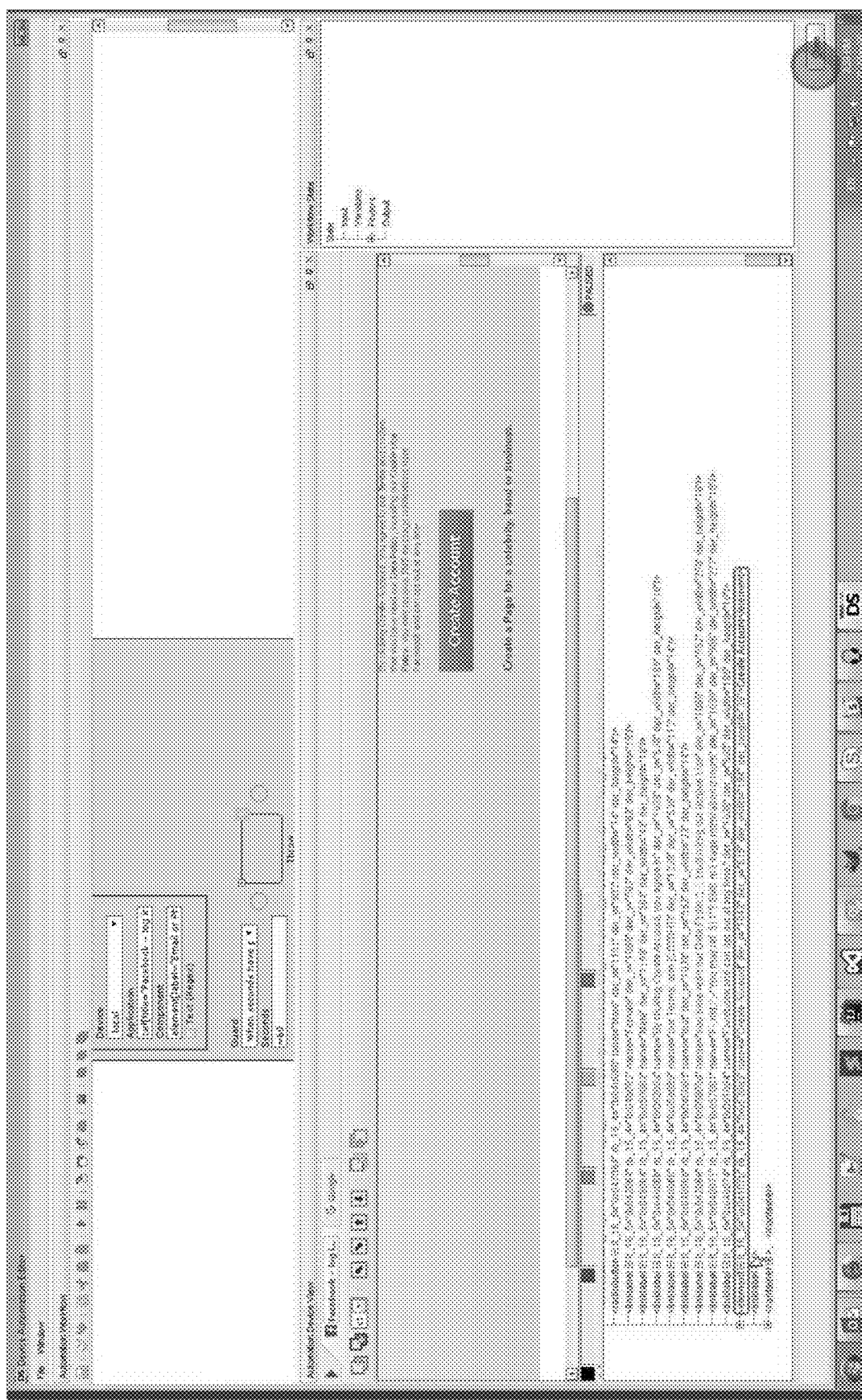

For instance, while not specifically shown in FIG. 3, image/interface 300 may additionally or alternatively include one or more tables 400 such as shown in FIG. 4. The table(s) may generally be of any type known in the art, and optionally include a title or label 406, as well as optional headers 402a, 402b. Although the headers 402a, 402b as shown in FIG. 4 are column headers, row headers (not shown) may be additionally or alternatively included, in accordance with various implementations of tables as described herein. The tables 400 may be 1×1 tables, in which case the table is synonymous with a "field" or "cell" as defined hereinabove, or may include a plurality of fields/cells such as cells 404a-404m shown in FIG. 4. Each cell may be configured to receive textual information, and/or may include other element types such as combo boxes (see 404h), check boxes (see 404k), icons (see 404f), etc. as described herein and would be understood by a person having ordinary skill in the art upon reading the present descriptions.

The image/interface and underlying descriptions and functionality thereof may be described or represented by a tree-based structure, such as shows in FIGS. 5A-5F, according to various aspects and at least two exemplary interfaces 500, 510.

Image Processing

In general, the presently disclosed inventive concepts include receiving one or more images/interfaces representing a website/application, such as interface 300 as shown in FIG. 3. The images/interfaces are preferably received in a "raw" form, such that the image/interface may represent, but does not actually include underlying functionality. In other words, the image/interface only includes image data and optionally metadata describing characteristics of the image (such as format, creation date, filename, resolution, size, color depth, etc. as would be understood by a person having ordinary skill in the art upon reading the present disclosure), but does not provide any underlying functionality of the corresponding user interface. An example of a suitable image is a screenshot of a user interacting with a user interface, in one approach.

The received image(s)/interface(s) may be subjected to optional pre-processing operations to simplify the image/interface, followed by a series of image processing operations to identify various elements of the image/interface, and the results of the image processing operation(s) are input to a neural network to match elements to components/functions which may be engaged by an automated script/entity.

In a preferred implementation, the general process flow for image processing includes: (1) analyzing a layout of an image/interface to identify vertical and horizontal lines; (2) identifying small squares (e.g. checkbox elements), rectangles with a grid structure (e.g. tables) and other rectangles that may represent other specific elements (e.g. containers, buttons, input fields, etc.) via intersections of the found lines; (3) building or establishing an initial hierarchy (e.g. a tree structure) among the identified elements (so that simple elements belong to surrounding containers that may belong to other containers); (4) identifying edges that have a substantially circular form and inserting corresponding radio button elements into surrounding (parent) containers; (5) identifying edges that are likely to represent icons and/or textual elements; (6) distinguishing icons from textual elements using a neural network and inserting each, respectively, into parent containers; (7) identifying logical relationships (e.g. labeling) between textual elements and non-textual elements (e.g. icons, fields, checkboxes etc.); (8) performing text recognition on the identified textual elements; and (9) converting the tree structure into an XML tree describing the elements, properties thereof (e.g. position content, associated function and/or labels, etc.) and logical associations therebetween (e.g. nesting relationships between elements). Further details of the foregoing operations are provided hereinbelow.

More specifically, image processing may include pre-processing of the image, optionally at each step or for each type of element sought for detection. Various types of elements may be sought for detection in a sequential manner, preferably where each step in the sequence leverages information determined in previous step(s), e.g. to avoid false positive detection of apparently "overlapping" elements. In a preferred implementation, element identification includes line identification, followed by check box detection, followed by generic rectangular element (e.g. container/button/input field) detection, followed by table detection, followed by radio button detection, followed by icon detection, and finally followed by text element detection, text recognition, and construction of an appropriate data structure, preferably a tree-based data structure and more preferably an XML tree.

While the foregoing order of operations is particularly advantageous in the preferred implementation of the presently disclosed inventive concepts, it should be appreciated that alternative embodiments may employ different sequence(s), may perform any one of more of the presently described image processing operations in an iterative fashion, may omit certain image processing operations described herein, and/or may employ the various image processing operations in different combinations, all without departing from the scope of the presently disclosure.

However, it should be noted that the particular order of operations set forth herein critically provides capability to ensure mutually exclusive categorization of various identified elements. As described in greater detail below, by excluding from a set of candidate elements all elements identified as a different type in previous operations, the likelihood of identifying a single element as two different types (which may have similar characteristics otherwise difficult to distinguish between, such as icons and text) is mitigated or eliminated. Accordingly, in preferred implementations the order of operations set forth herein is strictly adhered to.

Figure 6:
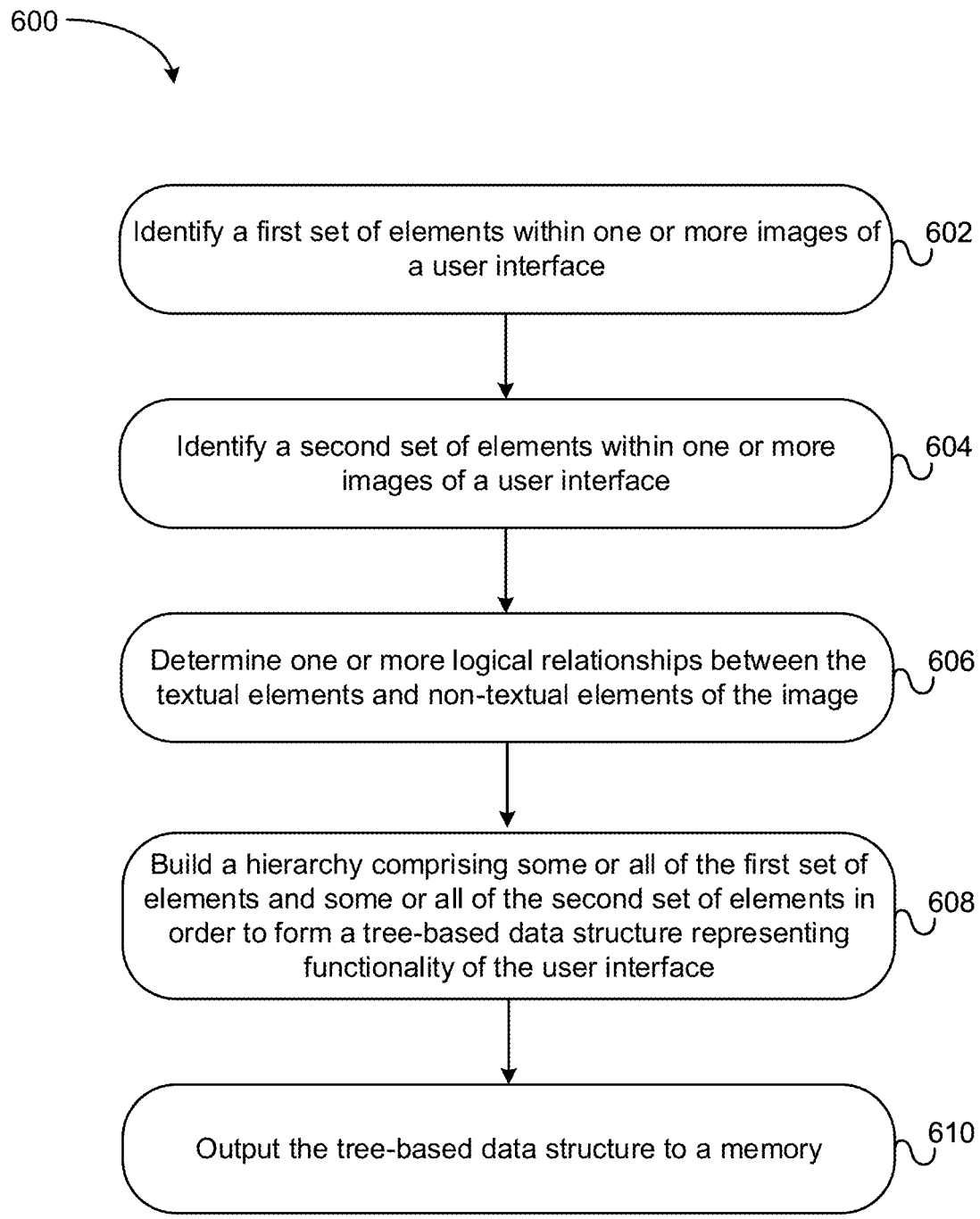
FIG. 6 is a flowchart of a method for intelligent screen automation, according to one embodiment.

Accordingly, FIG. 6 depicts one embodiment a method 600 for determining functional and descriptive elements of an application interface and/or image(s) of an application interface (also referred to herein as "intelligent screen automation", in various embodiments), in accordance with the presently described inventive concepts. The method 600 may be performed in any suitable environment, including but not limited to those shown in FIGS. 1-5F, in various approaches. Moreover, the method 600 may include more operations, functions, features, etc. than shown in FIG. 6, and/or may omit certain operations, functions, features, etc. shown in FIG. 6, according to various embodiments and without departing from the scope of the present disclosure.

In accordance with FIG. 6, method 600 includes operation 602, where a first set of elements is identified from within one or more images of a user interface. Each of the first set of elements is independently selected from the group consisting of: vertical lines, horizontal lines, and rectangular elements.

In operation 604 of method 600, a second set of elements is identified from within one or more images of a user interface. Each of the second set of elements is independently selected from the group consisting of: radio buttons, icons, and textual elements.

Optionally, the first and/or second set(s) of elements may be filtered to remove candidate elements that: duplicate a root container of a tree-based data structure representing functionality of the user interface; are adjacent to another candidate element; adjoin another candidate element; are an invalid container candidate elements; and/or conflict with another candidate element, in various embodiments.

Method 600 also includes operation 606, in which logical relationships between the textual elements and non-textual elements of the image are determined.

Operation 608 involves building a hierarchy comprising some or all of the first set of elements and some or all of the second set of elements in order to form a tree-based data structure representing functionality of the user interface.

In various implementations of method 600, the tree-based data structure is output to a memory in operation 610.

Of course, in various embodiments of the presently described inventive concepts, overall intelligent screen automation method 600 as shown in FIG. 6 and described generally above may include any individual feature or combination of features, functions, operations, criteria, thresholds, etc. described herein without limitation and without departing from the scope of the inventive concepts presently disclosed.

For instance, in one approach of method 600, identifying the first set of elements includes sequentially searching for different types of elements within the image(s) of the interface. Preferably, the sequential search includes: line detection, check box detection, rectangular element detection, and/or table detection, in various embodiments. For each step of the sequential search, according to one embodiment elements present in the image/interface and detected as a type of element sought in a prior step of the sequential search are excluded from the search. Moreover, in one embodiment of method 600, line detection may involve: converting the one or more interface images from a standard color space to a Lab color space; determining a Euclidean distance between components L, a, and b for a plurality of adjacent pixels within the image(s); comparing the Euclidean distance for each pair of adjacent pixels to a minimum distance threshold; and at least partially in response to determining the Euclidean distance for a given pair of adjacent pixels is greater than the minimum distance threshold, designating the pair of adjacent pixels as a candidate line location. Moreover still, the Euclidean distance is preferably calculated for horizontally adjacent pixels within the image and for vertically adjacent pixels within the image. Of course, line detection may include any combination of functions, features, etc. described herein in various embodiments of method 600 without departing from the scope of the inventive concepts presented herein.

Optionally, the first and/or second set(s) of elements may be filtered to remove candidate elements that: duplicate a root container of a tree-based data structure representing functionality of the user interface; are adjacent to another candidate element; adjoin another candidate element; are an invalid container candidate elements; and/or conflict with another candidate element, in various embodiments.

In more embodiments of method 600, check box detection may include: receiving a set of candidate line elements derived from the one or more images; searching for intersecting candidate line elements among the set of candidate line elements; and designating as check boxes intersecting lines forming a substantially square shape within a square candidate element of the image characterized by a length from about 10 pixels to about 25 pixels. Further still, check box detection in some embodiments may also include a series of filtering operations. The filters may include: filtering from the set of line candidates all lines having a length less than 10 pixels; filtering from the set of line candidates all lines having a length greater than about 18 pixels; combining neighboring lines from among the filtered set of line candidates; and searching among the filtered set of combined line candidates to identify a set of candidate rectangles; computing an aspect ratio of each candidate rectangle; and/or designating as check boxes each set of candidate rectangle having an aspect ratio from about 0.9 to about 1.14, in any combination or permutation.

In even more embodiments of method 600, table detection as described herein may involve: computing an area of each of a plurality of candidate rectangles derived from the image; sorting the plurality of candidate rectangles according to descending area; determining whether each candidate rectangle comprises multiple candidate rows, each candidate row having a same width as the candidate rectangle and a lesser height than the candidate rectangle; and in response to determining a given candidate rectangle includes multiple candidate rows: identifying all inner rectangles within the given candidate rectangle; determining an X-coordinate value for each of the inner rectangles; comparing the X-coordinate values for each row of the inner rectangles to the X-coordinate values for a topmost row of the inner rectangles. Table detection may further include defining a table element in the tree-based data structure in response to determining the X-coordinate values for at least one row of the inner rectangles match the X-coordinate values for the topmost row of the inner rectangles.

With continuing reference to FIG. 6 and intelligent screen automation method 600, in one embodiment identifying the second set of elements includes sequentially searching for different types of elements within the image. The sequential search preferably involves: radio button detection; icon detection; and textual element detection.

Radio button detection, in accordance with one implementation of method 600, includes but is not limited to: reducing color depth of the image to generate a grayscale rendering of the image; blurring the grayscale rendering of the image; detecting a set of candidate edges within the blurred grayscale rendering of the image; filtering candidate edges having a length greater than a predetermined maximum length threshold from the set of candidate edges; identifying a set of contours and a corresponding set of bounding boxes within the filtered set of candidate edges; expanding an area of each bounding box by one pixel in each cardinal direction; combining overlapping ones of the bounding boxes; shrinking the area of each bounding box by one pixel in each cardinal direction; computing an aspect ratio of each bounding box; removing from the set of bounding boxes any bounding box having an aspect ratio less than about 0.9; removing from the set of bounding boxes any bounding box having an aspect ratio greater than about 1.1; removing from the set of bounding boxes any bounding box having a height less than a predetermined minimum height threshold; removing from the set of bounding boxes any bounding box having a height greater than a predetermined maximum height threshold; estimating a radius of all remaining bounding boxes in the set of bounding boxes; counting black pixels within a six-pixel window of a length of the radius of each respective bounding box; filtering from the set of bounding boxes any bounding box having a black pixel count to radius ratio less than about 5.8; and designating as candidate radio buttons the remaining bounding boxes in the set of bounding boxes.

Referring again to method 600, in one embodiment icon detection involves: reducing color depth of the image to generate a grayscale rendering of the image; blurring the grayscale rendering of the image; detecting a set of candidate edges within the blurred grayscale rendering of the image; filtering the set of candidate edges to remove candidate edges having a length greater than a predetermined maximum length threshold; computing a set of bounding boxes for the remaining candidate edges; removing from the set of bounding boxes any bounding box corresponding to a previously-identified element; combining proximate, adjacent bounding boxes within the set of bounding boxes; removing from the set of bounding boxes any bounding box having a height or a width less than a predetermined minimum threshold; removing from the set of bounding boxes any bounding box having an aspect ratio greater than a predetermined maximum aspect ratio threshold; and removing from the set of bounding boxes any bounding box having an aspect ratio less than a predetermined minimum aspect ratio threshold; and designating all remaining bounding boxes in the set of bounding boxes as candidate icons.

In particularly preferred embodiments of method 600, each of radio button detection and icon detection comprise contour detection.

Parameters employed for contour detection in the context of radio button detection may include: applying a Gaussian blur with a kernel size of about 3×3; a high hysteresis threshold in a range from about 80 to about 100; and a low hysteresis threshold in a range from about 20 to about 40.

Moreover, radio button detection may be performed iteratively; and parameters for contour detection in a second iteration of radio button detection may include: applying a standard blur with a kernel size of about 3×3; and a test ratio of about 5.15; and wherein parameters for contour detection in a second iteration of radio button detection comprise: applying no blur; and a test ratio of about 7.5.

Further still, in one embodiment parameters for contour detection in the context of icon detection may include: not applying any blur; as well as employing a high hysteresis threshold in a range from about 40 to about 75; and a low hysteresis threshold in a range from about 125 to about 175.

In a particularly preferred embodiment of method 600, textual element detection involves distinguishing the textual elements from the icons using a neural network. Distinguishing the textual elements from the icons using the neural network may optionally be based at least in part on one or more features selected from the group consisting of: a number of colors feature, a color distance to surrounding area feature, an area of dilated image feature, a minimum color distance to neighboring textual elements feature.

Further still, determining logical relationships between the textual elements and non-textual elements of the image, in illustrative approaches to method 600, includes detecting a plurality of labels corresponding to the plurality of elements.

The tree-based data structure is preferably constructed from the identified elements and associated information (e.g. position, associated function(s), etc.), and accordingly identifies: each element in the user interface; an (x, y) coordinate location of one or more vertices of each of the elements in the user interface or a corresponding bounding box; an aspect ratio of each of the elements in the user interface or the corresponding bounding box; a label of some or all of the elements in the user interface; and a logical structure of each of the elements in the user interface.

Additional details of each of the foregoing detection techniques are described in greater detail below.

Line Identification

Figure 7:
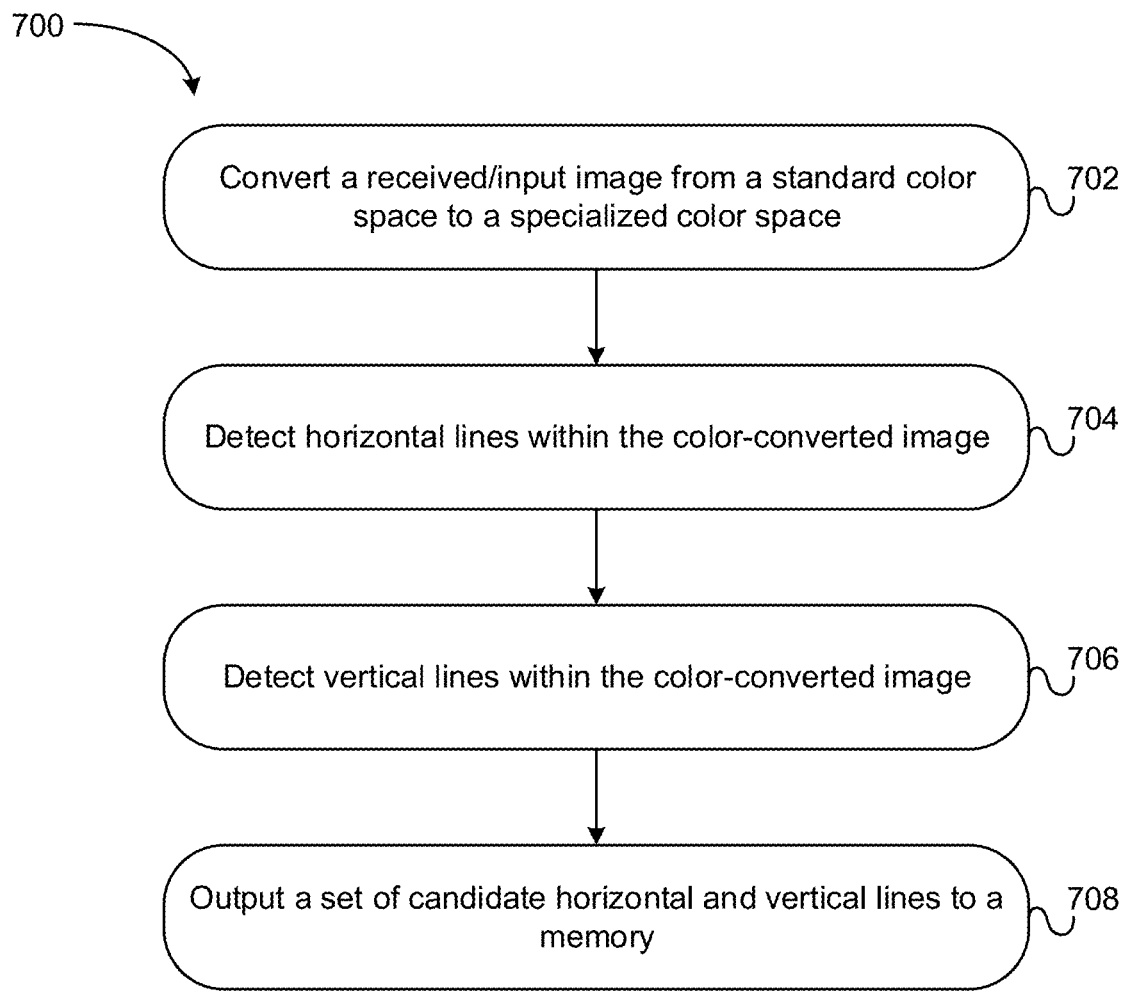
FIG. 7 is a flowchart of a method for detecting lines within an application interface, according to one embodiment.

Turning now to FIG. 7, a flowchart of a method 700 for detecting lines within an image/interface of an application as described herein is shown, according to one exemplary embodiment. The method 700 may be performed in any suitable environment, including but not limited to those shown in FIGS. 1-5F, in various approaches. Moreover, the method 700 may include more operations, functions, features, etc. than shown in FIG. 7, and/or may omit certain operations, functions, features, etc. shown in FIG. 7, according to various embodiments and without departing from the scope of the present disclosure.

In one approach, line identification seeks to identify substantially horizontal and vertical lines (e.g. lines oriented within ±5-10 degrees of being parallel to the x or y axis of the image, respectively) within the interface 300, and optionally intersections therebetween. Importantly, it should be noted that while in some approaches line detection may be performed to identify lines per se in the image/interface 300, in preferred approaches line detection serves as an initial step/starting point for identifying other element types described herein, particularly check boxes, icons, and tables. In various embodiments, lines detected according to method 700 may be excluded from the tree-based data structure ultimately constructed to reflect the image/interface 300.

Accordingly, in preferred embodiments line detection shall be understood as an initial operation of an overall process seeking to define other element types, including but not limited to rectangles such as fields, tables, buttons, check boxes, cells, etc. as defined herein and having a substantially rectangular shape. Accordingly, in various approaches of the presently described inventive concepts line detection may not be performed as a standalone process, but rather is performed as part of other detection techniques such as shown in FIGS. 7-8, 10-13 and described in greater detail hereinbelow.

In an exemplary embodiment, and now with reference to FIG. 7, line identification may involve a first operation 702, including converting an input image from a standard color space such as RGB to a specialized color space such as a Lab color space. Within this color space, adjacent pixels are evaluated row-by-row and column-by-column to detect differences in the Euclidean distance between components L, a, and b for adjacent pixels. If the difference between the adjacent pixels is greater than a first predetermined threshold, e.g. a threshold value of about 5.0 according to one exemplary embodiment, this is taken as a possible line location and a corresponding pixel (i.e. a pixel at the same relative pixel position where the difference was determined) of a binary image is designated black.

In another exemplary embodiment, line identification may be performed in different, preferably consequent, phases, each phase employing a different, second threshold value, e.g. a threshold of about 9.0. Of course, as will be understood by skilled artisans upon reading the present descriptions and according to various embodiments, the different threshold values are preferably chosen based on suitability for detecting lines forming a particular type of object in the image/interface. The foregoing exemplary values of 5 and 9 for the first and second thresholds, respectively, are particularly useful for detecting lines per se, especially standalone lines that are not part of another element type.

In another exemplary embodiment, first and second thresholds may be set to a same or similar value, e.g. to facilitate detection of rectangular elements. In one such implementation for rectangular element detection, the thresholds may be set to a value of approximately 4.94, e.g. a value in a range from about 4 to about 6, from about 4.5 to about 5.5, from about 4.75 to about 5.25, from about 4.9 to about 5.1, or any other suitable value within the exemplary range. Empirically, 4.94 was determined to be a particularly suitable value for rectangular element detection.

For example, the first threshold mentioned above may be well-suited for identifying standalone and/or neighboring lines, while a second threshold may be particularly suited for detecting lines forming a check box element, a third threshold may be particularly suited for detecting lines forming a table or other similar rectangular element, etc. as would be understood by a person having ordinary skill in the art upon reading the present disclosure.

In a preferred approach, horizontal lines may be detected in operation 704 by serially applying the first and second thresholds mentioned above to the lines detected in operation 702. For instance, first and/or second thresholds may be iteratively applied while analyzing the image. In a particularly preferred approach, for each point $(x_i, y_i)$ in the image (potentially excepting points along the right and/or bottom image boundaries): if a first distance $D_1$ measured between the point $(x_i, y_i)$ and a second nearby point $(x_i, y_{i+1})$ is greater than the first threshold, a second distance $D_2$ between a third nearby point $(x_{i+1}, y_i)$ and a fourth nearby point $(x_{i+1}, y_{i+1})$ is greater than the first threshold, and either or both of: a third distance $D_3$ between the first point $(x_i, y_i)$ and the third nearby point $(x_{i+1}, y)$ is less than or equal to the second threshold, and/or a fourth distance $D_4$ measured between the second nearby point $(x_i, y_{i+1})$ and the fourth nearby point $(x_{i+1}, y_{i+1})$ is less than or equal to the second threshold, then point $(x_i, y_i)$ is considered as belonging to a horizontal line.

To detect vertical lines a third operation 706 may be implemented. In one embodiment, it is advantageous to transpose the image, and apply essentially the same logic as presently described for horizontal lines. Moreover, transposing the result to obtain the position of vertical lines in the original image/interface.

Once all rows and columns have been evaluated, a set of candidate lines is output and stored to memory in operation 708. Outputting a final binary image is optional and helpful for debugging and quality analysis purposes but not necessary for the purpose of line detection per se. In several exemplary embodiments, some or all of the line candidates are "neighboring lines" as defined and described in greater detail below.

Preferably, line detection is a heuristic process, but other known line detection techniques may be employed in various embodiments and without departing from the scope of the presently disclosed inventive concepts.

Check Box Detection

Figure 8:
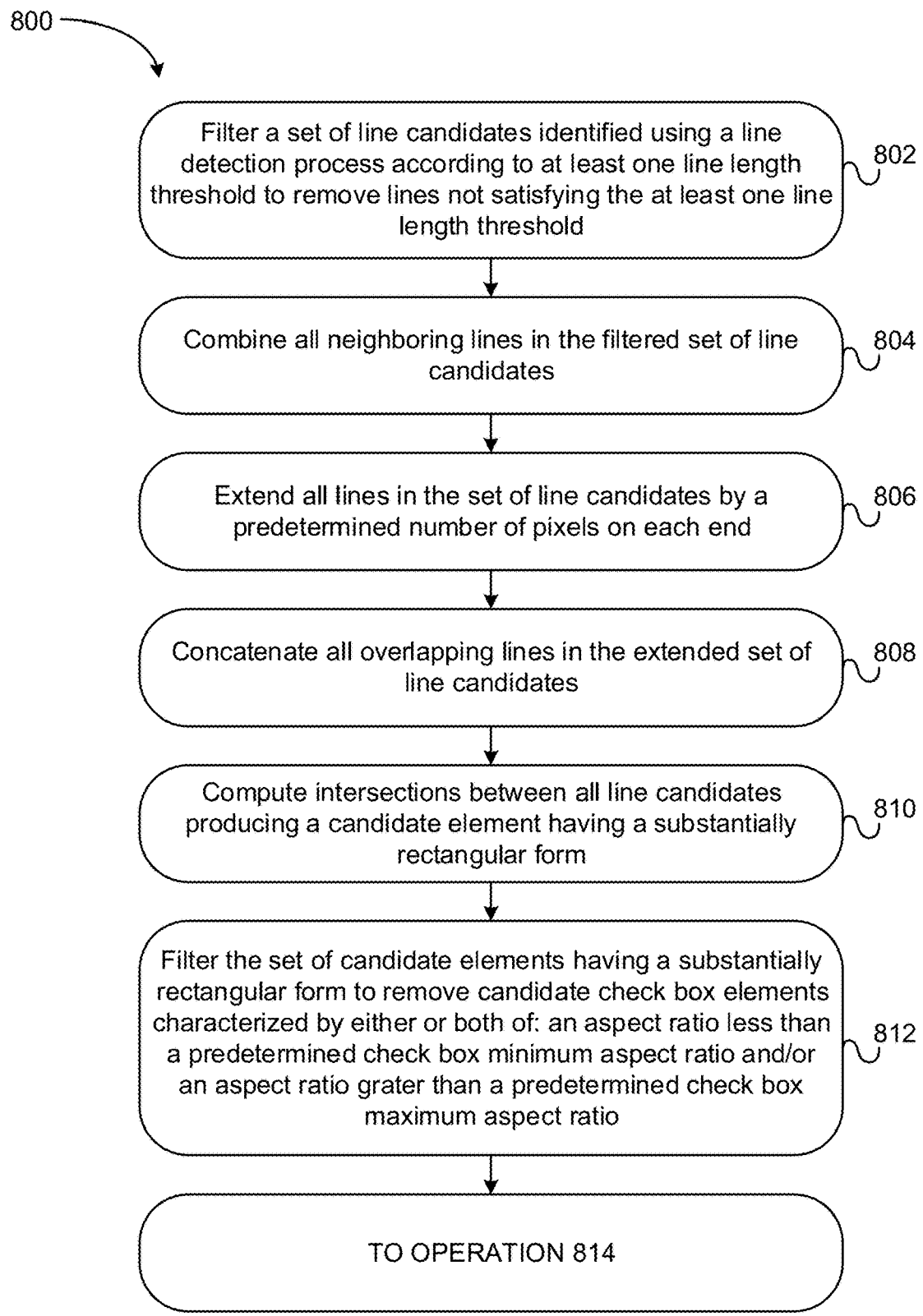
FIG. 8 is a flowchart of a method for detecting check boxes within an application interface, according to one embodiment.
Figure 8:
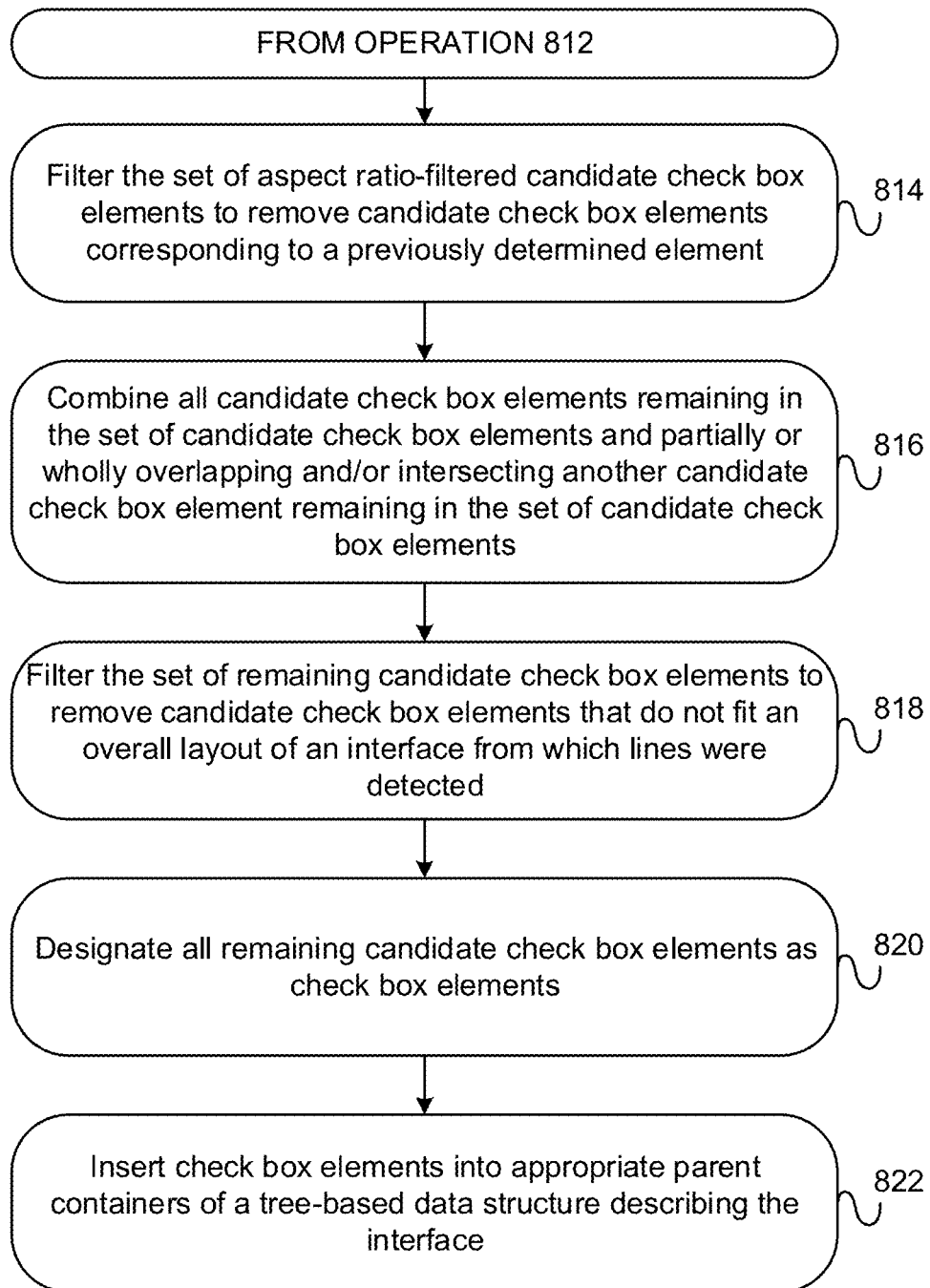

Turning now to FIG. 8, a flowchart of a method 800 for detecting check boxes within an image/interface of an application as described herein is shown, according to one exemplary embodiment. The method 800 may be performed in any suitable environment, including but not limited to those shown in FIGS. 1-5F, in various approaches. Moreover, the method 800 may include more operations, functions, features, etc. than shown in FIG. 8, and/or may omit certain operations, functions, features, etc. shown in FIG. 8, according to various embodiments and without departing from the scope of the present disclosure.

Check box detection also preferably operates on a set of line candidates identified, e.g. using a line detection techniques such as described above regarding method 700 as input.

In preferred embodiments, for check box detection the first threshold is preferably in a range from about 3.0 to about 7.0, more preferably a range from about 4.0 to about 6.0, and most preferably a value of about 5.0. Similarly, the second threshold is preferably in a range from about 7.0 to about 11.0, more preferably a range from about 8.0 to about 10.0, and most preferably a value of about 9.0.

Moreover, in one embodiment check box detection may consider only line candidates about 5 pixels to about 25 pixels in length, preferably about 10 to about 20 pixels, and most preferably about 10 to 18 pixels as potential edges of a check box. Accordingly, line candidates having a length less than a minimum length threshold, as well as line candidates having a length greater than a maximum length threshold, are preferably removed from the set of line candidates. In various embodiments, the minimum length threshold for check box detection may be a value in a range from about 3 pixels to about 5 pixels, preferably a value in a range from about 7 pixels to about 13 pixels, and most preferably a value of about 10 pixels. Similarly, the maximum length threshold for check box detection may be a value in a range from about 15 pixels to about 30 pixels, preferably a value in a range from about 16 pixels to about 20 pixels, and most preferably a value of about 18 pixels. Accordingly, the set of line candidates provided as input may be filtered to remove line candidates of length less than the minimum length threshold and/or line candidates of length greater than the maximum length threshold, in some approaches.

Within these constraints, substantially square shapes defined by horizontal and vertical intersections of lines within the image may be considered check boxes, and the set of line candidates may be searched for combinations of lines meeting these criteria. As understood herein, "substantially square shapes" are shapes having four substantially linear sides of approximately equal length (e.g. ±5%) and which are joined by substantially right angles are to be considered "substantially square," although other quadrilateral shapes such as slightly rhomboidal shapes are also to be considered "substantially square" within the context of the inventive concepts described herein.

Accordingly, and again with reference to FIG. 8, in a particularly preferred implementation, check box detection may proceed substantially according to the following procedure.

In operation 802, a set of horizontal and/or vertical line candidates identified by the line detection process referenced above regarding FIG. 7 and line detection method 700 is received, and the set is filtered to remove lines with a length less than a predetermined minimum line length threshold (e.g. a value in a range from about 5 pixels to about 15 pixels, preferably a value in a range from about 7 pixels to about 12 pixels, most preferably a value of about 10 pixels, in several approaches), as well as to remove lines with a length greater than a predetermined maximum line length threshold (e.g. a value in a range from about 12 pixels to about 24 pixels, preferably a value in a range from about 15 pixels to about 21 pixels, most preferably a value of about 18 pixels, in various embodiments).

In operation 804, all "neighboring lines" within the filtered set are combined. Lines qualify as "neighbors" if the lines: have the same orientation (i.e. horizontal or vertical); are located in adjacent rows (for vertical lines) or columns (for horizontal lines); and have immediately adjacent or partially overlapping endpoints within a row (for horizontal lines) or column (for vertical lines). In other words, neighboring lines are parallel in orientation, and are positioned in adjacent rows or columns such that a first neighboring line extends to or into a second neighboring line without any visual gap therebetween.

In accordance with operation 806, all lines are extended on both endpoints by a predetermined length, e.g. a length in a range from about 1 to about 5 pixels, a length in a range from about 2 to about 4 pixels, and preferably a length of about 2 pixels. The reason for extending lines is to address two potential issues. In some embodiments truly rectangular objects may be rendered in a manner that makes the sides appear non-linear, and/or vertices appear non-square, i.e. slightly deviating from 90 degrees. Moreover, in practice the inventors discovered line detection as described hereinabove may detect false, small gaps in some lines (e.g. thin lines of about 1-4 pixels thickness). Extending detected lines by two pixels on each end adequately addresses these false negative detection issues, particularly in embodiments where otherwise substantially rectangular elements are characterized by rounded corners, and/or where lines appear to have gaps in the image.

All overlapping lines are concatenated in operation 808. Overlapping lines may be concatenated in any suitable manner that would be appreciated by a person having ordinary skill in the art upon reading the present disclosure.

In operation 810, intersections between lines producing a candidate check box element having a substantially rectangular form are computed, conditioned upon each edge forming the intersection having a length from about 10 pixels to about 18 pixels, inclusive. Accordingly, an edge length check may be performed prior to computing the intersection between any two given lines.

Candidate check box elements with an aspect ratio (W/H) less than a predetermined check box minimum aspect ratio (e.g. a value in a range from about 0.5 to about 1.5, preferably a value in a range from about 0.75 to about 1.25, more preferably a value in a range from about 0.8 to about 1.0, and most preferably a value of about 0.9) are removed from the remaining set in operation 812, as well as candidate check box elements with an aspect ratio greater than a predetermined maximum check box aspect ratio (e.g. a value in a range from about 0.75 to about 1.5, preferably a value in a range from about 0.9 to about 1.3, more preferably a value in a range from about 1.1 to about 1.2, and most preferably a value of about 1.14). The most preferred values of 0.9 and 1.14, respectively, were determined experimentally to correspond to typical check boxes as represented on various training images.

In operation 814, candidate check box elements previously determined to contain other candidate elements may be removed from the set. This operation reduces the likelihood of false-positively identifying a check box, e.g. as may be expected for a small, substantially square cell of a table. This operation advantageously detects checkboxes that have a double-lined border after binarization (or a border that appears at least partially double-lined). For example, this process reliably filters out checkbox candidates that includes one or more additional checkbox candidates.

Moreover, in operation 816, candidate elements with intersecting edges or portions are preferably combined into larger candidate elements, and the aforementioned aspect ratio filtering (e.g. to remove less than the predetermined minimum check box threshold, greater than the predetermined maximum check box aspect ratio threshold, and retain midrange) is repeated on the new set of candidate elements.

Candidate check box elements that do not fit the overall image layout are removed via filtering in operation 818. For example, candidate elements having a "parent" container (i.e. candidate elements contained within a larger container) with a width less than about 50 pixels may optionally be removed, as well as candidate elements having a central position Y coordinate value less than 30 pixels.

All candidate check box elements remaining after this final filtering step are designated check boxes in operation 820 and corresponding check box elements are inserted in to the respective parent container (preferably the root) of the tree-based data structure describing the image/interface in operation 822.

Generic Rectangular Element Detection

Figure 9:
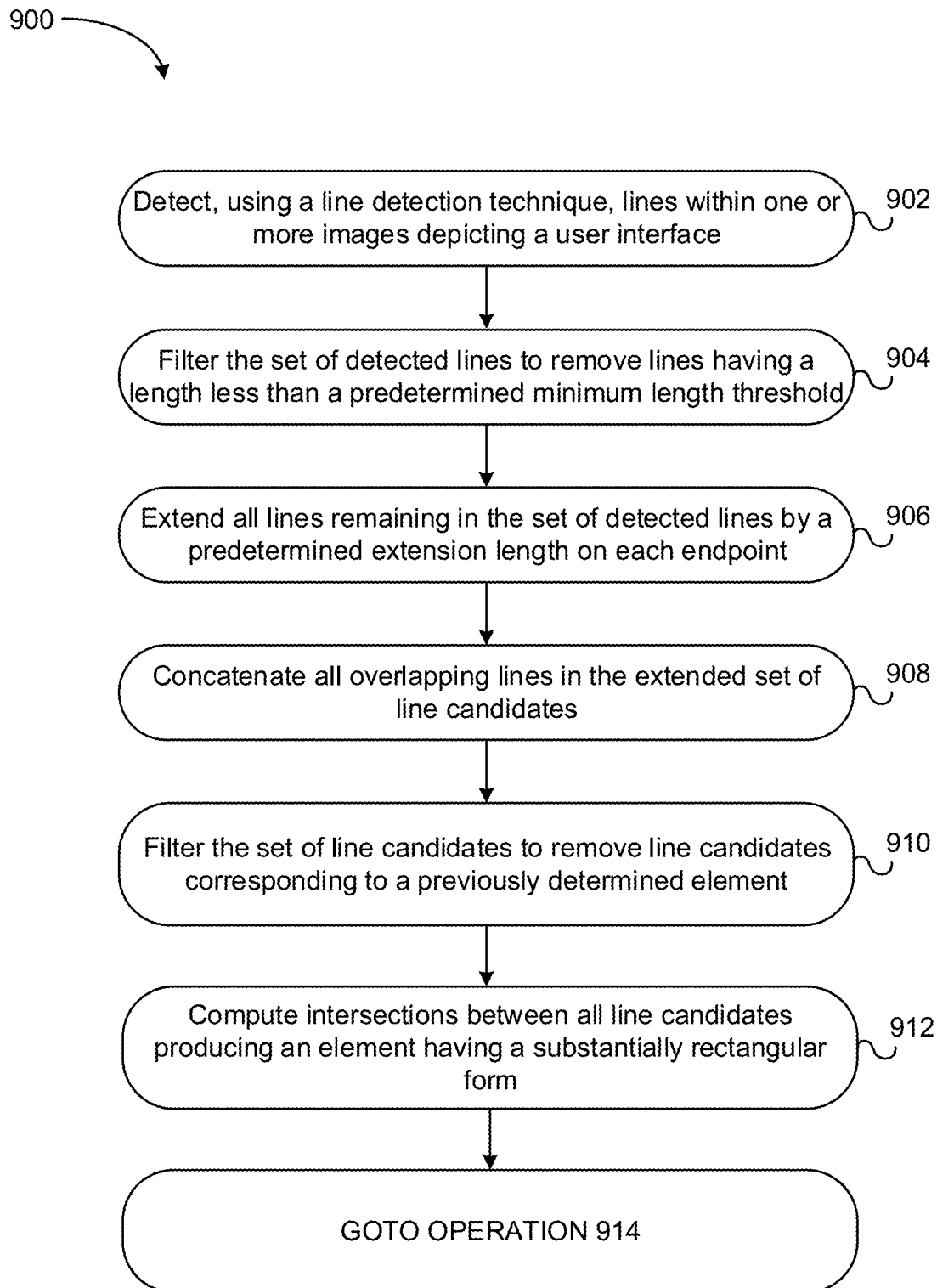
FIG. 9 is a flowchart of a method for detecting generic rectangular elements within an application interface, according to one embodiment.
Figure 9:
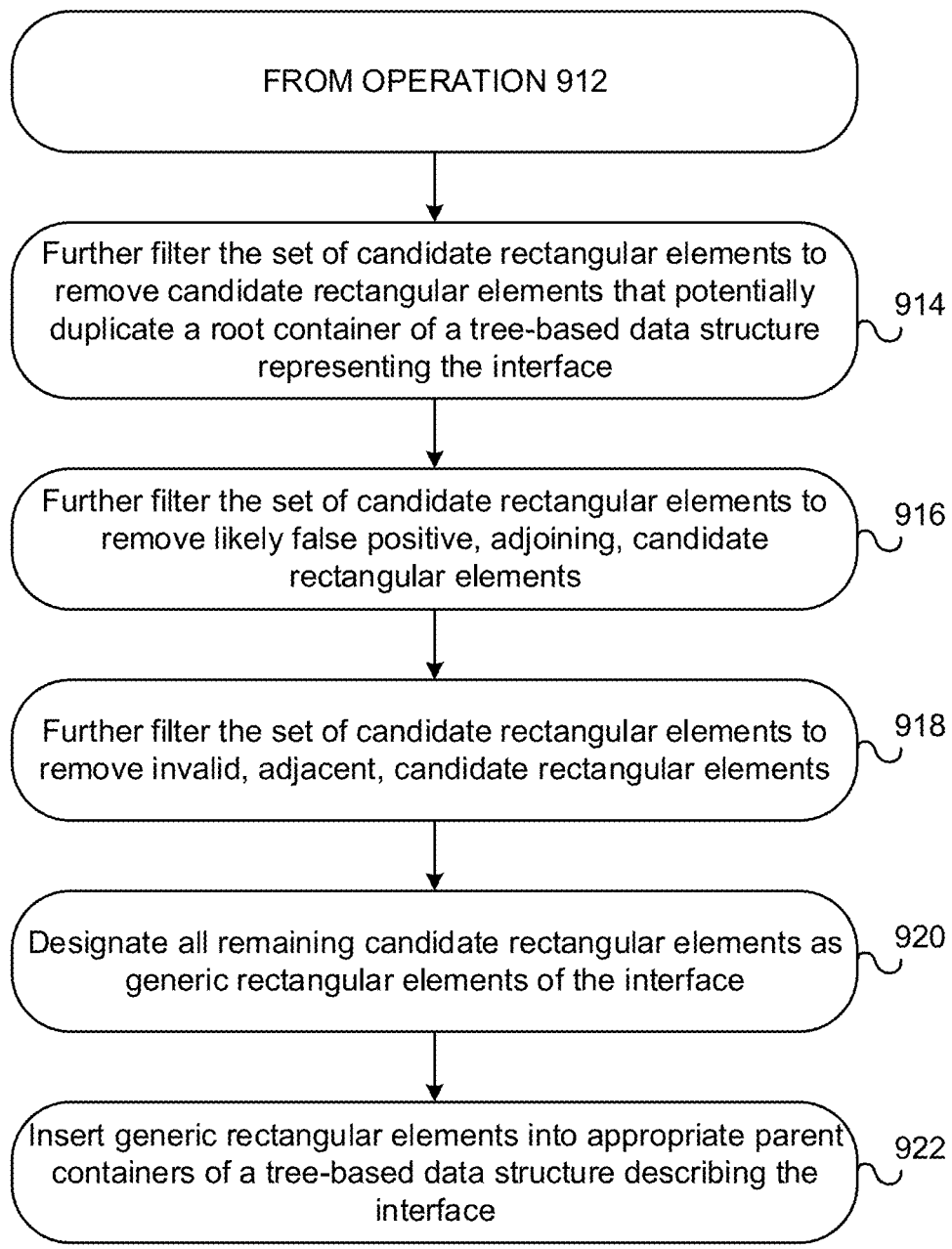

Turning now to FIG. 9, a flowchart of a method 900 for detecting generic rectangular elements within an image/interface of an application as described herein is shown, according to one exemplary embodiment. The method 900 may be performed in any suitable environment, including but not limited to those shown in FIGS. 1-5F and 9A-9B, in various approaches. Moreover, the method 900 may include more operations, functions, features, etc. than shown in FIG. 9, and/or may omit certain operations, functions, features, etc. shown in FIG. 9, according to various embodiments and without departing from the scope of the present disclosure.

As noted above, the overall intelligent screen automation algorithm 600, according to one exemplary embodiment, also includes detecting generic rectangular and/or substantially rectangular elements within the image/interface. Detecting candidate generic rectangular elements advantageously removes undesired (e.g. uninformative, irrelevant, noisy, redundant, etc.) candidate rectangular elements of the image/interface detected previously, e.g. using the aforementioned check box detection techniques.

In an exemplary embodiment, rectangular element detection per method 900 includes operation 902, in which lines are detected. Line detection may be performed substantially as described above with reference to FIGS. 7 and/or 8, but using different threshold(s) than employed in other steps, e.g. check box detection, in various embodiments. Preferably the Euclidean distance thresholds used for detecting lines are in a range from about 4 to about 6, most preferably about 4.94 each, as described hereinabove. The result is a new set of lines.

From this new set of lines, horizontal lines shorter than a minimum horizontal length threshold (e.g. a value in a range from about 13 pixels to about 21 pixels, more preferably a value in a range from about 15 pixels to about 19 pixels, and most preferably a value of about 17 pixels) are removed, along with vertical lines shorter than a minimum vertical line length threshold (e.g. a value in a range from about 10 pixels to about 19 pixels, more preferably a value in a range from about 13 pixels to about 18 pixels, and most preferably a value of about 15 pixels), in operation 904.

In operation 906 of method 900, lines are extended on both endpoints by a predetermined extension length, which may be e.g. a value in a range from about 1 to about 5 pixels, preferably a value of about 3 pixels.

All overlapping lines are concatenated, and neighboring lines are combined using any suitable technique in operation 908, e.g. using techniques as described in greater detail regarding check box detection in one embodiment, though other techniques that would be known to a skilled artisan and appreciated as suitable for concatenating and/or combining overlapping and/or neighboring lines may be employed without departing from the scope of the presently disclosed inventive embodiments.

In operation 910, lines that correspond to, e.g., intersect and/or overlap with, already detected elements (e.g. check boxes) are removed from the set lines, and intersections between remaining lines producing and/or bounding a candidate generic rectangular element characterized by a substantially rectangular form are computed, conditioned upon a determination that each edge forming the intersection has width greater than or equal to a minimum intersecting edge width threshold (e.g. a value in a range from about 10 pixels to about 20 pixels, preferably a value in a range from about 13 pixels to about 19 pixels, more preferably a value in a range from about 14 pixels to about 18 pixels and most preferably a value of about 16 pixels); and/or a height greater than or equal to a minimum intersecting edge height threshold (e.g. a value in a range from about 9 pixels to about 19 pixels, preferably a value in a range from about 11 pixels to about 17 pixels, more preferably a value in a range from about 12 pixels to about 16 pixels, and most preferably a value of about 14 pixels). Other intersecting lines are preferably discarded. Skilled artisans will appreciate the foregoing values may be varied in additional approaches, e.g. within a range of ±2 pixels of the exemplary values stated above.

In operation 912, a set of candidate generic rectangular elements is generated based on the remaining set of line candidates. More specifically, intersections are computed between all remaining line candidates, and those intersecting lines producing an element having a substantially rectangular form are retained for further analysis as set forth below, in one embodiment.

With continuing reference to method 900 as shown in FIG. 9, in one embodiment filtering out candidate rectangular elements that potentially "duplicate" the root container may be beneficial, and is preferably performed in operation 914. In practice, some interfaces/images of applications have specific borders that lead to false detection of inner container in the root container. If a border of a candidate element is within a threshold distance of the root border (e.g. within about ±7 pixels, in accordance with one embodiment), the candidate rectangular element is deemed a potential duplicate and filtered out of the set.

Figure 9B:
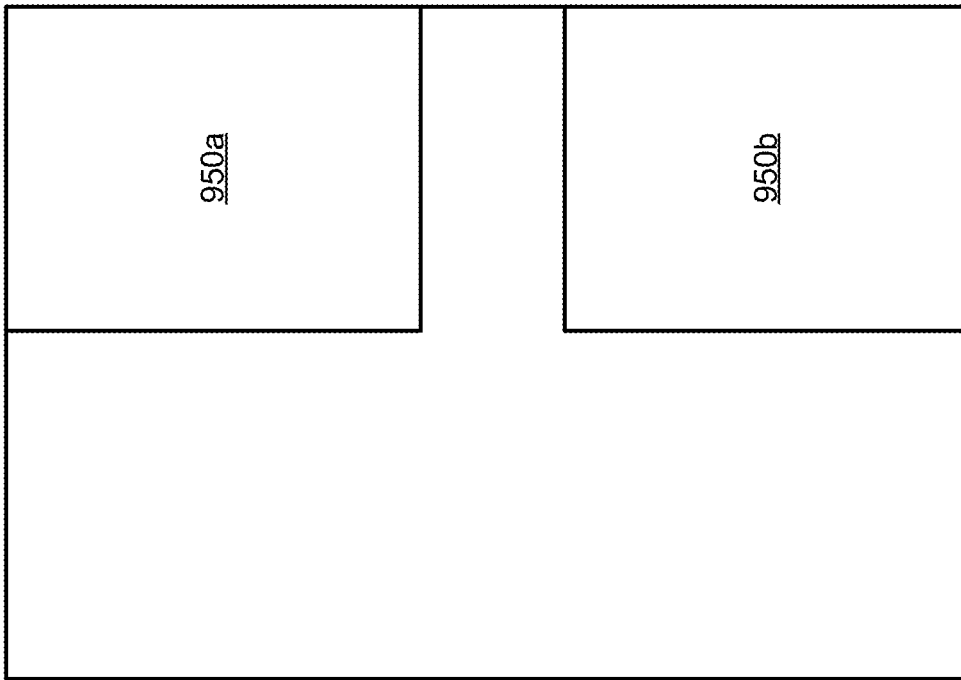
FIG. 9B is a simplified schematic of an application interface including several generic rectangular elements and excluding the false-positively identified generic rectangular element shown in FIG. 9A, according to one embodiment.
Figure 9A:
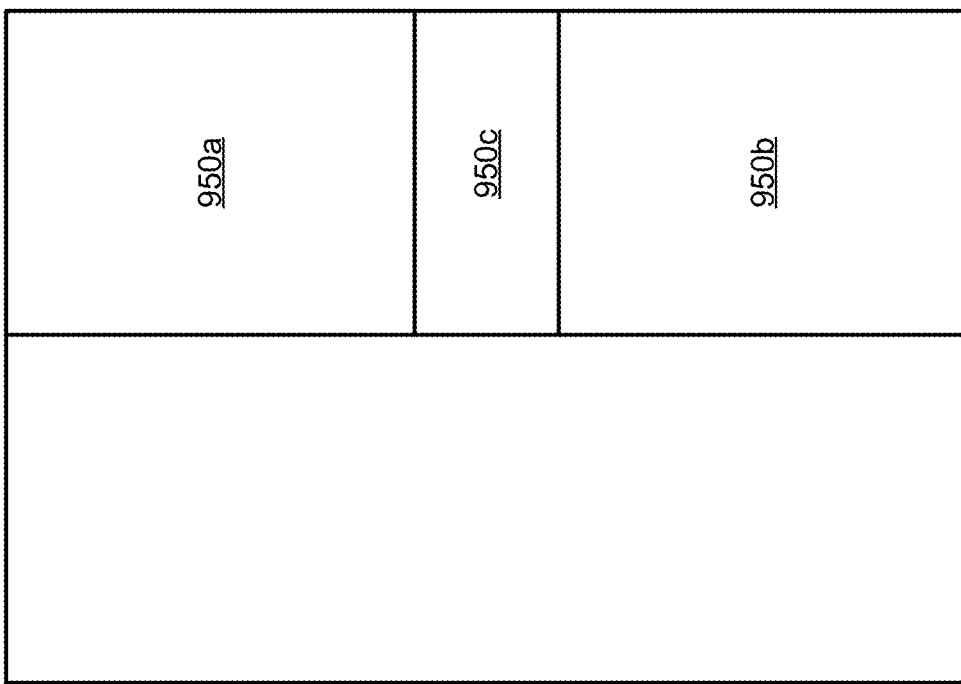
FIG. 9A is a simplified schematic of an application interface including several generic rectangular elements and at least one false-positively identified generic rectangular element, according to one embodiment.

Further in operation 916, and with reference to illustrative FIGS. 9A-9B, according to several implementations it is advantageous to filter out likely false positive candidate generic rectangular elements generated during extension of lines in line detection. This most commonly occurs when two adjacent but truly separate containers/elements have vertices in close proximity, such as the two containers 950*a* and 950*b* shown in FIGS. 9A-9B. The bottom-left corner of container 950*a* and the top-left corner of container 950*b* are sufficiently proximate that the extension of vertical lines, e.g. as performed in operation 906, causes a new container 950*c* to be identified in the vertical space between containers 950*a* and 950*b*, as shown in FIG. 9A. However, this is not a true container, and so it is preferred to filter out such candidates that were falsely detected, resulting in an element and/or container definition as reflected in FIG. 9B.

Figure 9C:
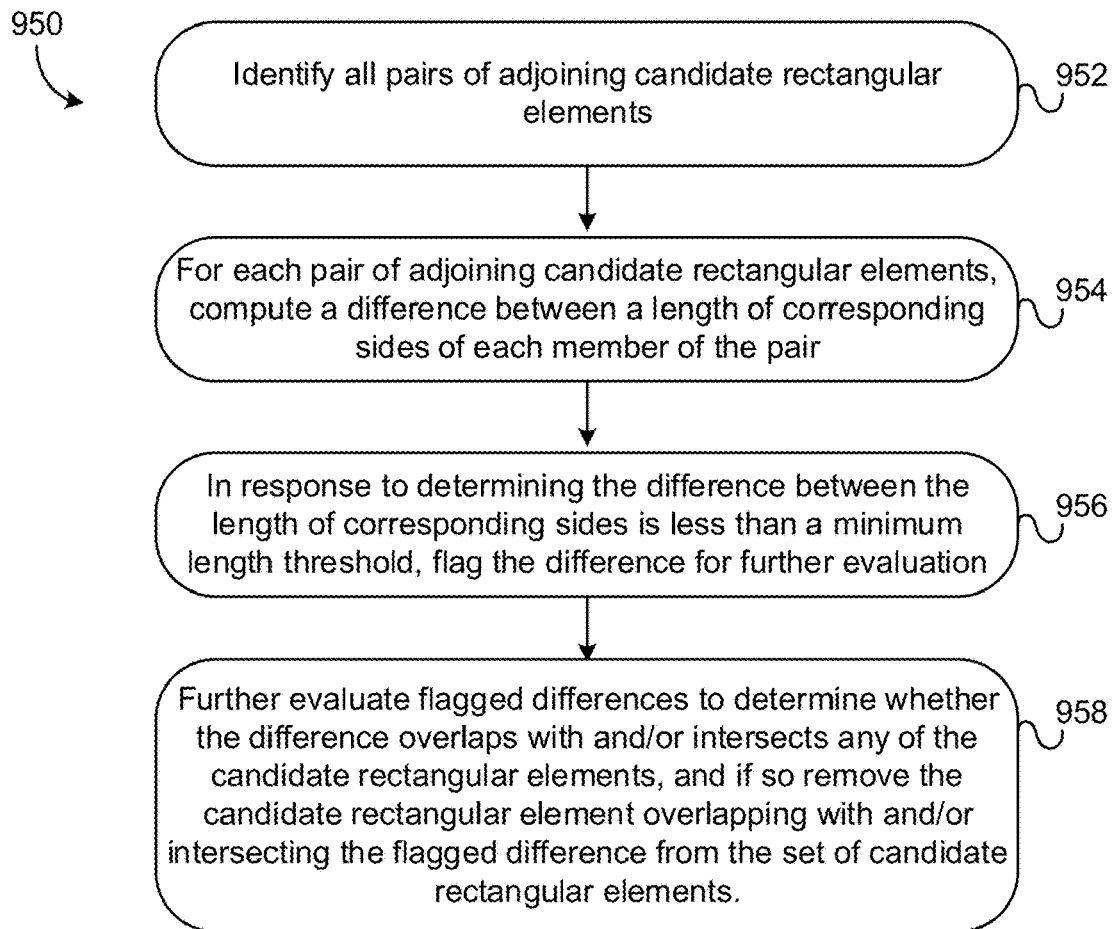
FIG. 9C is a flowchart of a method for identifying and eliminating/filtering false-positively identified generic rectangular elements from a rendering of an application interface, according to one embodiment.

In an exemplary approach, filtering out false positive, adjoining, candidate generic rectangular elements, such as false positive container 950*c* shown in FIG. 9A, includes performing operations such as shown in method 950 of FIG. 9C. The method 950 may be performed in any suitable environment, including but not limited to those shown in FIGS. 1-5F and 9A-9B, in various approaches. Moreover, the method 950 may include more operations, functions, features, etc. than shown in FIG. 9C, and/or may omit certain operations, functions, features, etc. shown in FIG. 9C, according to various embodiments and without departing from the scope of the present disclosure.

In operations 952-956 of method 950, false-positively detected lines are identified. The identification process may include finding all pairs of adjoining candidate generic rectangular elements within the set in operation 952. As understood herein, "adjoining" candidate elements are those who share at least one entire border (i.e. at least one edge of each member of the pair of "adjoining" candidate elements have identical coordinates within the original image/interface) and where at least one member of the pair is partially or wholly encompassed by the other.

In operation 954, a difference between the lengths of corresponding sides of each respective member of the pair is computed, i.e. corresponding side lengths for each member of the pair are compared and a difference therebetween is calculated.

If the difference in side line length for any given set of corresponding horizontal lines within a pair of adjoining candidate generic rectangular elements is less than a minimum horizontal line length threshold (e.g. a value in a range from about 11 pixels to about 21 pixels, preferably a value in a range from about 13 pixels to about 19 pixels, more preferably a value in a range from about 15 pixels to about 17 pixels and most preferably a value of about 16 pixels), and/or if the difference in side line length for any given set of corresponding vertical lines within a pair of adjoining candidate generic rectangular elements is less than a minimum vertical line length threshold (e.g. a value in a range from about 8 pixels to about 18 pixels, preferably a value in a range from about 10 pixels to about 16 pixels, more preferably a value in a range from about 12 pixels to about 13 pixels and most preferably a value of about 13 pixels), the difference for the pair of adjoining candidate generic rectangular elements is flagged in operation 956 for further evaluation.

With continuing reference to method 950 and FIG. 9C, in operation 958 the difference flagged in operation 956 is further evaluated to determine whether: the horizontally oriented difference line (having a length less than the horizontal line minimum length threshold employed above in operation 954) overlaps with top and/or bottom boundaries/edges of a candidate rectangular element; or the vertically oriented difference line (having a length less than the vertical line minimum length threshold employed above in operation 954) overlaps with left and/or right boundaries/edges of a candidate rectangular element, then the overlapping candidate element is removed from the set of candidate generic rectangular elements in operation 958.

Figure 9D:
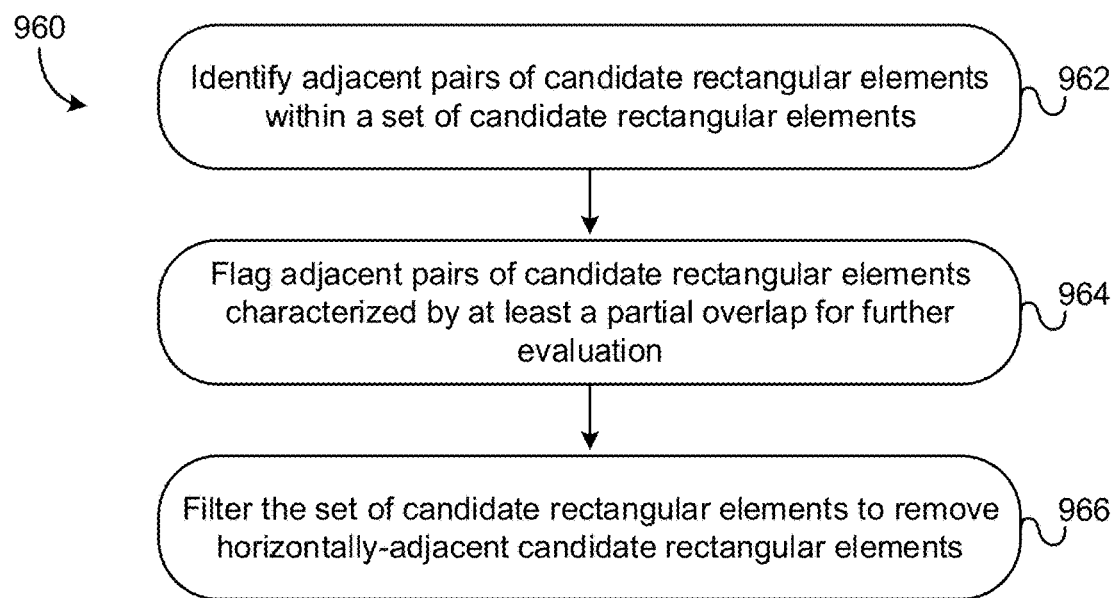
FIG. 9D is a flowchart of a method for identifying and eliminating/filtering false-positively identified generic rectangular elements from a rendering of an application interface, according to one embodiment.

Optionally, and in one approach following table detection as described herein below, additional filtering of the rectangular elements to remove invalid "adjacent elements" may be performed in operation 918. The additional filtering preferably includes some or all of the operations of method 960 as shown in FIG. 9D, without limitation. The method 960 may be performed in any suitable environment, including but not limited to those shown in FIGS. 1-5F and 9A-9B, in various approaches. Moreover, the method 960 may include more operations, functions, features, etc. than shown in FIG. 9D, and/or may omit certain operations, functions, features, etc. shown in FIG. 9D, according to various embodiments and without departing from the scope of the present disclosure.

In operation 962 of method 960, each rectangular element may be evaluated to identify "adjacent elements", defined as a pair of candidate elements (and/or previously detected elements) in which one member of the pair is located wholly or partially inside the other, and which share at least one border. Accordingly, adjacent elements according to various embodiments may include candidate elements and/or previously detected elements which partially overlap, wholly overlap, are horizontally adjacent (i.e. share part or all of a common border defined by a vertical line in the image/interface), are vertically adjacent (i.e. share part or all of a common border defined by a horizontal line in the image/interface), or any combination of the foregoing criteria.

In preferred approaches, overlapping adjacent candidate rectangular elements are flagged for further processing in operation 964. Accordingly, in one embodiment candidate rectangular elements wholly overlapping another candidate rectangular elements are flagged for further processing.

Horizontally-adjacent candidate rectangular elements that do not overlap are also preferably filtered out of the set of candidate rectangular elements as invalid container candidates in operation 966 of method 960.

Accordingly, candidate rectangular elements not meeting both of the foregoing criteria, i.e. not including any overlap and not being horizontally-adjacent, are considered good candidate rectangular elements/candidate containers and are preferably retained in the set and defined as generic rectangular elements in operation 920.

Adjacent and/or overlapping candidate rectangular elements may be considered "invalid" in some embodiments because, as determined in more than 50% of cases evaluated experimentally, detected, horizontally adjacent candidate rectangular elements do not in fact represent a container of elements, i.e. were false positives.

For instance according to one practical example, a number of buttons can be located in a row close to each other. While appearing to be adjacent rectangular elements, in some approaches the buttons may not represent a container of buttons, rather the buttons may be independent of each other. In other approaches, the buttons may represent a single container of multiple buttons.

In another illustrative scenario, for vertically-adjacent rectangular objects the situation may be the opposite as for horizontally adjacent candidate rectangular elements. Again, as determined experimentally in one embodiment, vertically-adjacent candidate rectangular elements more often than not (>50% of cases) truly represent a container of elements of some type. Accordingly these false positive associations are preferably eliminated by filtering out "invalid" candidates using the overlap and horizontal adjacency criteria stated above.

Additional filtering may also include sorting the special candidate rectangular elements (i.e. those detected as wholly or partially overlapping in the aforementioned filtering and flagged for further processing). The additional filtering may include sorting the special candidate rectangular elements e.g. by ascending area, according to an exemplary approach. Starting from the smallest candidate rectangular element, each candidate rectangular element is compared to the set of flagged candidate rectangular elements to identify any flagged candidates having at least one shared border. If so, the candidate rectangular element under evaluation is filtered out of the set of candidate rectangular elements.

Further, additional filtering may include removing candidate rectangular elements that potentially "duplicate" other, previously-discovered elements (e.g. checkboxes, tables). To do so, each candidate rectangular element is evaluated to determine whether the border(s) of the candidate are located within a threshold distance (e.g. within about 1-5 pixels, about 5 pixels, about 3 pixels, about 1 pixel, etc. in various embodiments) of another defined element. If so, the candidate rectangular element is removed from the set of candidate rectangular elements.

In various approaches, the candidate rectangular element may be removed in response to determining the border is located within the threshold distance along a direction perpendicular to the longitudinal axis of the candidate rectangular element border and nearest candidate element border. In other words, if the borders being evaluated are aligned substantially horizontally (e.g. top and bottom borders), i.e. along the X-axis, then the threshold distance may be measured along the Y-axis, and vise-versa.

Further still, additional filtering in accordance with several implementations may include filtering out candidate elements that potentially "duplicate" the root container. Some applications have specific borders that lead to false detection of inner container in the root container. If one or more borders of a candidate rectangular element is located within a threshold proximity (e.g. within about 7 pixels) of the root border, the candidate rectangular element is preferably discarded from the set of candidate rectangular elements.

In more approaches, additional filtering may comprise filtering out candidate rectangular elements that "conflict" with each other. This step preferably includes evaluating candidate rectangular elements in a pairwise fashion, and determining whether one or more of the following conditions are satisfied. If so, the pair of candidates being evaluated is considered "conflicting" and filtered out of the candidate element set.

With continuing reference to filtering out "conflicting" candidate rectangular elements, the aforementioned criteria include, but are not limited to the following.

In one embodiment, a first criterion is that a first candidate rectangular element of the pair of candidate rectangular elements is not located within a second candidate rectangular element of the pair of candidate rectangular elements. Likewise, a second criterion is that the second candidate rectangular element is not located within the first candidate rectangular element.

A third criterion, in various embodiments, is whether the first candidate rectangular element, after being "squeezed" (i.e. reduced in length by 1 pixel in each of the four cardinal directions, e.g. +x, −x, +y, −y for a 2D coordinate system) intersects with the second candidate rectangular element after the second candidate rectangular element is similarly "squeezed." In practice this third criterion corresponds to candidate rectangular elements having an intersection defined by perpendicular lines, in exemplary approaches.

Again, preferably additional filtering includes removing conflicting candidate rectangular elements meeting at least one, more preferably all of the foregoing three criteria.

Once filtering and/or additional filtering is complete, the remaining candidate rectangular elements in the set of candidate rectangular elements are defined as "generic rectangular elements" of the image/interface and evaluated to determine the appropriate position within an overall data structure, preferably a tree-based data structure, using any suitable technique that would be known to a person having ordinary skill in the art upon reading the present disclosure. Once the appropriate position within the data structure is determined, the generic rectangular elements are preferably inserted into the data structure to reflect the detected elements and logical relations therebetween, e.g. as described above for operation 920 of method 900, in various embodiments. In particularly preferred approaches, the final tree structure may be converted into an XML data structure, and more preferably an XML tree.

Essentially, as referenced herein building a tree-based data structure reflecting elements of an image/interface includes determining the appropriate position of each element within an overall data structure involves expanding the structure in-breadth and in-depth depending on element location, e.g. by sorting the candidate elements by area. Then, in descending order, sorted candidate elements are preferably evaluated against the current status/form of the data structure to find the smallest element or container that includes the candidate element. If a larger/parent element includes the candidate element, it is preferable to redefine and/or modify the element type to "container" (according to preferred embodiments, "elements" by definition do not include any children as described herein).

Accordingly, in various approaches of the presently described inventive concepts, "element type" may exclusively be a single element type, such as "container," "radio button," "table," "cell," etc. as described herein. In more approaches, "element type" may include a descriptive element type such as "radio button," "table," "cell," etc. as described herein, and optionally a hierarchical element type such as "parent," "child," "container," etc. as described herein and as would be appreciated by a person having ordinary skill in the art upon reading the present disclosure.

Regardless, in preferred approaches the output of the candidate rectangular element detection process described above is a structure, preferably a tree-based data structure, and includes containers, tables (which may be considered, in one embodiment, a specific type of a container), elements, checkboxes (which may be considered, in more embodiments, a specific type of element), and/or any combination thereof, without limitation, in various embodiments.

Table Detection

In several illustrative implementations of the presently described inventive concepts, table detection preferably follows line detection and/or check box detection, although skilled artisans will appreciate table detection (as with any specific element type detection process described herein) may be performed at any point in the overall intelligent screen automation process.

According to the preferred implementation, table detection relies on a list of all possible rectangles and all bordered rectangles on the image/interface determined from the set of line candidates mentioned above, preferably after applying one or more filters as described hereinabove regarding line detection and/or check box detection, in various approaches. From this dataset, an algorithm attempts to determine rows within the possible rectangles, and sorts the rectangles starting from the highest area and descending to the lowest area. Upon determining a rectangle is or includes a row, the cell heights are compared, while all cells in a column are assumed to have a same width. Accordingly, in some embodiment it is preferably assumed that tables do not include any merged cells.

Figure 10:
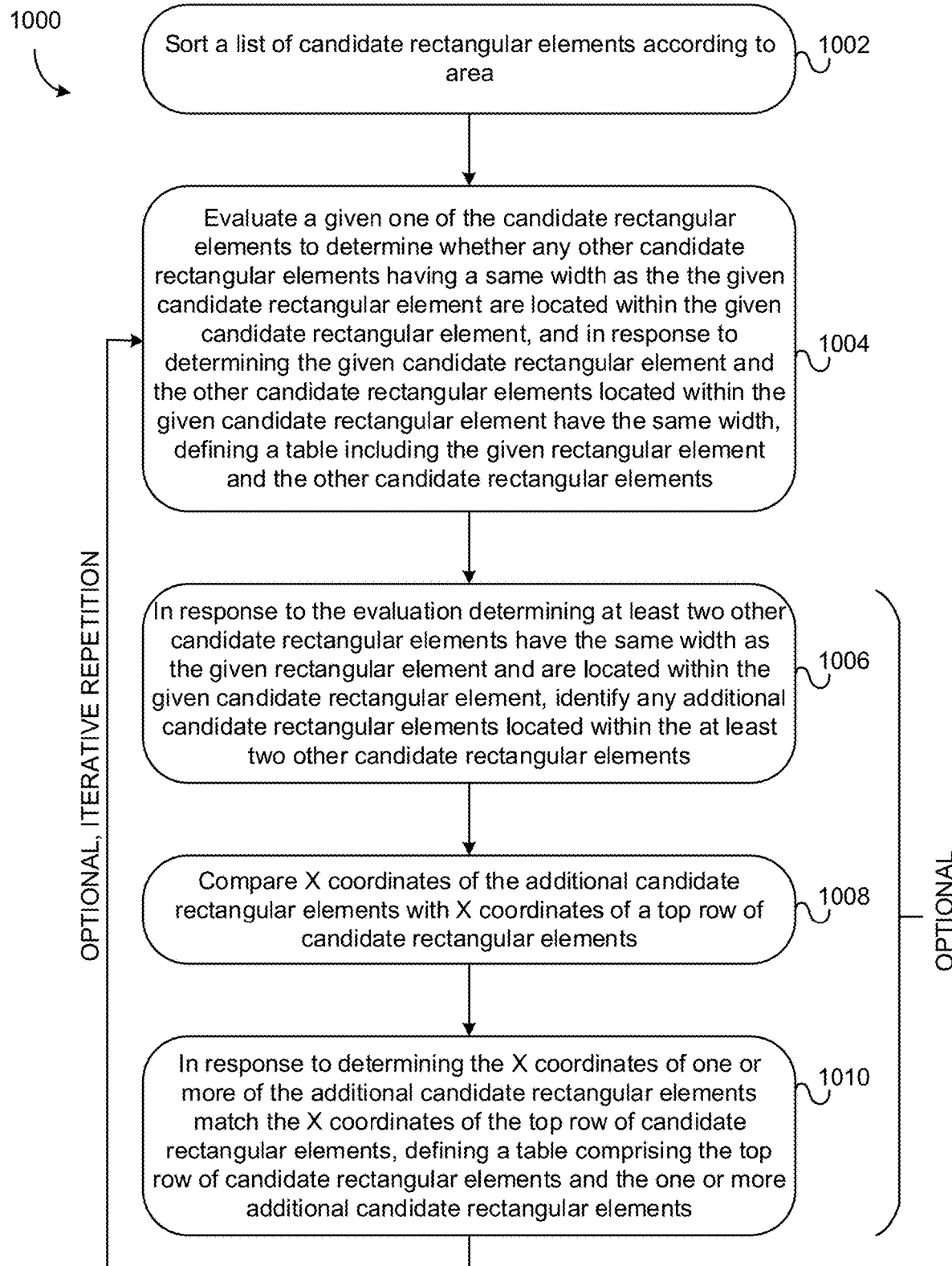
FIG. 10 is a flowchart of a method for detecting tables within an application interface, according to one embodiment.

An exemplary algorithm 1000 for detecting tables via determining potential rows, in an illustrative implementation, is shown in FIG. 10, and includes the following operations. Of course, the method 1000 may be performed in any suitable environment, including but not limited to those shown in FIGS. 1-5F and 9A-9B, in various approaches. Moreover, the method 1000 may include more operations, functions, features, etc. than shown in FIG. 10, and/or may omit certain operations, functions, features, etc. shown in FIG. 10, according to various embodiments and without departing from the scope of the present disclosure.

In operation 1002 of method 1000, a list of all possible rectangles and all bordered rectangles on the image/interface determined using rectangular element detection as described above is sorted according to rectangle area, outputting a list of possible rectangles sorted according to descending area.

The following operation 1004, and optionally operations 1006-1010 are also preferably performed on the sorted list of possible rectangles, in iterative fashion.

Operation 1004 includes evaluating a given candidate rectangular element for inner rectangles (row candidates) with the same width but smaller height (which may indicate rows of a table), and which do not include any other rectangles from the same set.

In one simplified embodiment of method 1000, table detection may end after identifying all row candidates by iteratively performing operation 1004 across all candidate rectangular elements. In such embodiments, the table may be defined according to the outer boundaries of the parent container, and the identified rows.

On the other hand, if, and preferably only if, the foregoing evaluation in operation 1004 identifies at least two row candidates, then in an optional operation 1006 all inner rectangles (which may indicate cells/fields of a row) within each row candidate are identified.

If, and preferably only if, the foregoing field/cell identification outputs a list of rows each having the same number of fields/cells, then in an optional operation 1008 the X coordinates of each found cell candidate are compared against the X coordinates of the top row of the Table (i.e. the header). If the X coordinates of the top row cells are determined match the X coordinates of subsequent rows (optionally within a predetermined threshold tolerance, e.g. a tolerance in a range from about ±1 to about ±5 pixels), a table is defined as an element in the corresponding tree structure in operation 1010.

Notably, in some embodiments the foregoing table detection algorithm operates under the assumption that all cells of a table have a constant width, and no merged cells are present in the table. In addition, it is worth noting that this algorithm need not be performed on all inner rectangles of the table. The area-based sorting operation forces identification of the larger table and all constituent rows/columns/fields/cells first, obviating the need to repeat the analysis for lower level structures of the table and saving computational resources in the process.

Upon detecting the rows and columns of a table, elements within the table such as textual elements, check boxes, combo boxes, drop-down lists, icons, and the like may optionally be identified. Preferably, at least textual elements and check boxes are identified.

In particularly preferred embodiment, a comparison between the locations of previously determined check boxes is performed with respect to the location of the table cells. If a check box location falls within the scope of a cell, the cell is designated a parent container for the check box. Notably, only one check box per cell is permitted, in an exemplary implementation of this preferred embodiment.

Radio Button Detection

Radio button detection involves several operations, in various implementations. In a preferred embodiment, radio button detection occurs substantially as shown in method 1100 and described hereinbelow with reference to FIG. 11.

Generally, if not provided in grayscale format, the image/interface 300 is rendered grayscale, using any suitable known technique in the art. Next, and optionally, one or more blur operations such as a Gaussian blur, median blur, or the like may be applied to the grayscale image to reduce noise. Following grayscale and/or blur rendering, a contour detector is applied. The results of the contour detector are filtered, e.g. to remove candidates that are within a predefined pixel proximity to previously identified elements, removing candidates that would result in a radio button overlapping a previously identified element, etc.

To specifically identify radio buttons, e.g. as distinguished from other elements, a central pixel within a candidate element corresponding to the candidates is searched and analyzed based on a connected component analysis. More specifically, a circumferential area within the image/interface and surrounding a center point of each candidate radio button may be searched for connected component(s) existing within a predetermined threshold distance of the projected radius. If the number of pixels lying along the circumferential area include a threshold or greater number of pixels corresponding to a connected component surrounding the candidate element, then the candidate element is designated as a radio button.

In some embodiments, radio button detection may be facilitated using a "contour detector" algorithm to identify a set of contours within the image that may be or correspond to candidate radio buttons. Contour detection and the "contour detector" are described in greater detail below with reference to FIG. 11 and method 1100.

Since radio buttons provide ability to select from among mutually exclusive options, no radio button should be "alone" on a given interface or image 300. Accordingly, radio button recognition also includes detection of associated radio buttons. In this step, it is assumed that associated radio buttons will lie along a common horizontal and/or vertical axis. If one or more additional radio buttons may be identified using the foregoing procedure, and are determined to be positioned/aligned along a common horizontal or vertical line, then the set of radio buttons is validated and output. Otherwise, the container where the purported radio button was identified is invalid and excluded from the output set of radio elements.

Figure 11:
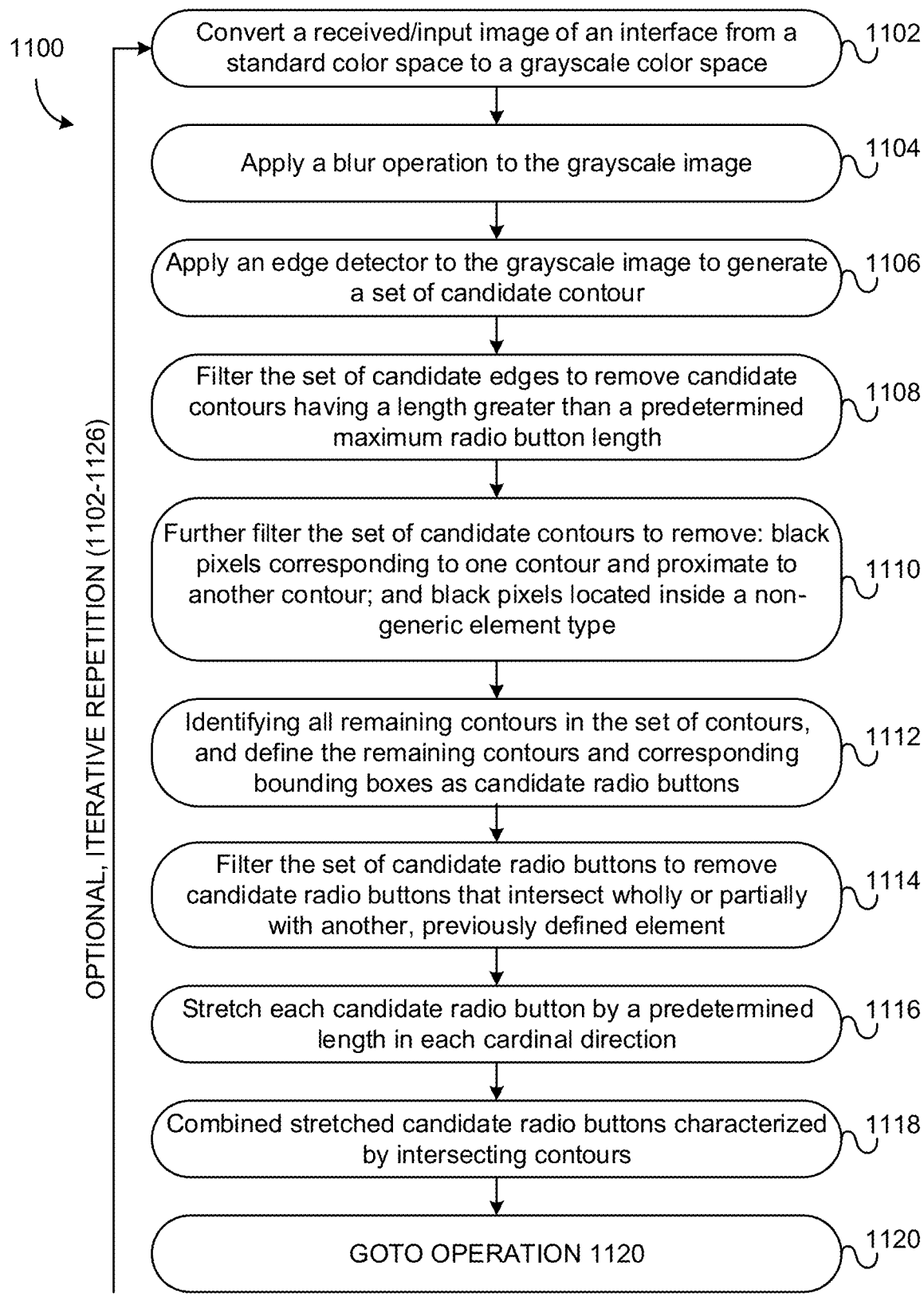
FIG. 11 is a flowchart of a method for detecting radio buttons within an application interface, according to one embodiment.
Figure 11:
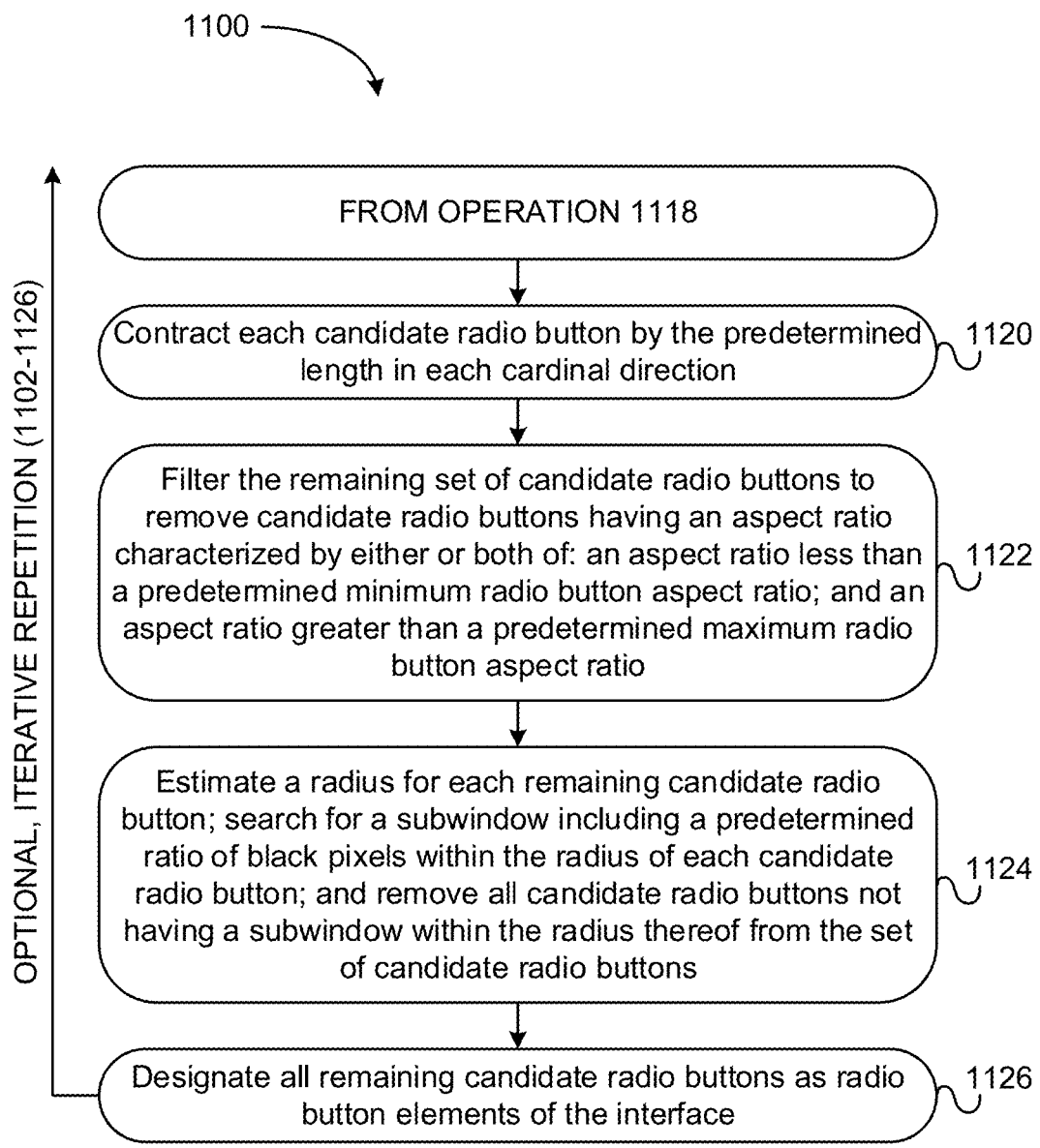

In a preferred implementation, radio button detection may proceed according to a method 1100 as shown in FIG. 11 and described in greater detail below. However, in alternative implementations, it should be understood that an image classifier such as a neural network or a support vector machine (SVM)-based classifier may be utilized to classify connected components of various types, including radio button candidates.

Returning now to the preferred radio button detection algorithm as shown in FIG. 11, in operation 1102 of method 1200, the native (typically RGB) image/interface is converted to grayscale, using any suitable known technique in the art.

According to the inventive embodiment depicted in FIG. 11, operation 1104 of method 1100 involves a blur operation such as a Gaussian blur. A kernel size of 3×3 is preferably applied to the grayscale image to reduce noise and small artifacts.

Moreover, operation 1106 includes applying an edge detector such as a Canny edge detector to the grayscale image with reduced noise and/or artifacts, e.g. geometric distortion, skew, etc. as would be understood by a person having ordinary skill in the art upon reading the present disclosures.

This step preferably outputs a binary image with edges in black superimposed on a white background. According to one exemplary embodiment, thresholds for the hysteresis procedure (which may be passed to OpenCV::Canny( )) are values in a range from about 20 to about 40, from about 25 to about 35, and most preferably a value of about 30 for the low threshold. For the high threshold, a value in a range from about 80 to about 100 may be employed, preferably a value in a range from about 85 to about 95, and most preferably a value of about 90.

Figure 12:
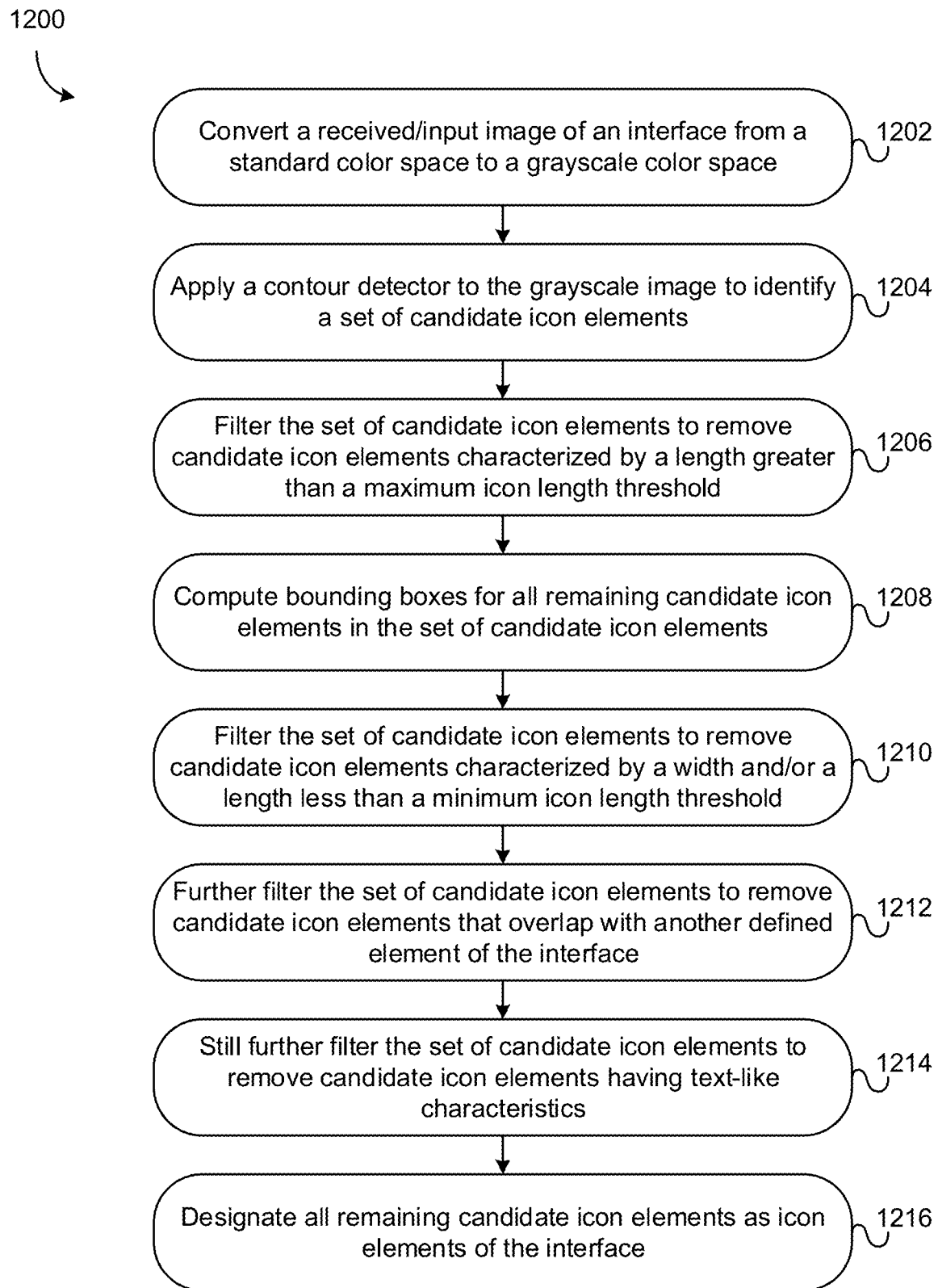
FIG. 12 is a flowchart of a method for detecting icons within an application interface, according to one embodiment.

With continuing reference to radio button detection method 1200 as shown in FIG. 12, during operation 1108 "long" lines having a length greater than a predetermined maximum radio button line length threshold (e.g. a value in a range from about 20 pixels to about 40 pixels, a value in a range from about 25 pixels to about 35 pixels, a value in a range from about 28 pixels to about 32 pixels, or most preferably a value of about 30 pixels) are filtered out of the set of candidate radio buttons. These long lines may be filtered out, in one embodiment, by rendering the constituent pixels thereof white in the binary image output from the Canny operation. In various approaches, outputting the binary image in operation 1208 shall be understood as an optional function that facilitates visual inspection of the performance of operations 1102-1106. In certain embodiments, binary image generation and/or output in operation 1108 may be omitted without departing from the scope of the presently described inventive concepts.

In operation 1110 of method 1100, two filters are applied to the set of identified contours and bounding boxes. For the first filter, black pixels proximate to another, previously-detected element are removed by rendering white the bounding box for a contour identified by the Canny edge detector in operation 1104, as well as any pixels within 2 pixels on both sides of bounding box itself. The second filter applied in operation 1110 involves removing black pixels located inside of elements of a non-generic type (e.g. check boxes, tables, cells, fields, etc., but not containers or generic rectangular elements) by rendering white all pixels inside the area of the respective element.

Still further, operation 1112 of radio button detection involves identifying contours and corresponding bounding boxes. This operation may be performed using any suitable method known in the art, such as one embodiment employing OpenCV features: OpenCV::findContours( ) and subsequently OpenCV::boundingRect( ).

In operation 1114, the set of combined candidate radio buttons is filtered to remove any candidate radio buttons that intersect with another element identified in a previous analysis, e.g. a check box, a table, etc., as well as to remove candidate radio buttons whose position indicates the candidate radio button wholly or partially encompasses another, previously detected element. Skilled artisans will appreciate the determination of intersection and/or overlap between elements may be performed using positional information describing the various elements and candidate radio button elements within the image/interface.

In various embodiments, operations 1104-1114 described hereinabove may be considered a "contour detection" algorithm or equivalently a "contour detector," which facilitates detection of various elements including but not limited to radio buttons considerably. The contour detector may be applied using different parameters to detect different types of elements, as described in further detail hereinbelow and as would be appreciated by a person having ordinary skill in the art upon reading the instant disclosure.

Now, with continuing reference to radio button detection method 1200 as depicted in FIG. 12, following application of the contour detector each candidate radio button is preferably stretched by one pixel in each cardinal direction (i.e. up, down, left and right, or +x, −x, +y and −y, equivalently) in operation 1116, and contours corresponding to intersecting candidates are combined in operation 1118 to form larger contours. Following candidate combination, the stretch is removed from the image/interface in operation 1120. Any known technique for stretching and/or determining intersecting candidates that would be appreciated as suitable by a skilled artisan reading the present disclosure may be employed, in various embodiments.

Next a filtering procedure is employed in operation 1122, in which all candidate radio buttons with an aspect ratio (W/H) less than a predetermined radio button minimum aspect ratio (e.g., a value in a range from about 0.75 to about 1.00, preferably a value in a range from about 0.85 to about 0.90, more preferably a value in a range from about 0.86 to about 0.88 and most preferably a value of about 0.87) are preferably removed, as are candidate radio buttons with an aspect ratio greater than a predetermined radio button maximum aspect ratio (e.g., a value in a range from about 0.80 to about 1.33, preferably a value in a range from about 0.95 to about 1.20, more preferably a value in a range from about 1.12 to about 1.17 and most preferably a value of about 1.15). Similarly, candidate radio buttons with a width or height less than 10 pixels, and with a width or height greater than 30 pixels may be removed from the set of candidate radio buttons. Further still, candidate radio buttons determined to exist within other candidate elements (e.g. internally nested candidates) may be filtered out of the set of candidates.

One illustrative approach to radio button detection involves estimating a radius for each remaining candidate radio button in operation 1124. Preferably, a search is performed within a six-pixel window of the length of the candidate radio button radius (preferably measured by two pixels on the far side, and four pixels on the near side). The search includes seeking any 1-pixel circular subwindow(s) where a ratio of black_pixel_count to subwindow_radius is greater than 5.8. If no such subwindows are found, the candidate radio button for which the radius was estimated is filtered out of the set.

In operation 1126, candidate radio buttons for which the search identifies at least one subwindow are retained, and designated "radio button elements"

In various embodiments, some or all of operations 1102-1126 of the radio button detection algorithm 1100 may be repeated iteratively. In one approach, a second iteration may include applying a standard (as opposed to Gaussian) blur, with kernel size of 3×3, and a test ratio of about 5.15. A third iteration may proceed without applying any blur, and using a test ratio of about 7.5. While the foregoing three-iteration approach was determined to provide robust recall and accuracy for radio button detection purposes, it will be appreciated by skilled artisans upon reading the present disclosure that in other embodiments more or less iterations, with similar or different blur parameters, threshold values, etc. may be employed without departing from the scope of the inventive concepts described herein.

Individual sets of candidate radio buttons may be generated for each iteration, and combined into a single combined list of candidate radio buttons, e.g. the union of some or all candidate sets, the intersect of some or all candidate sets, etc. in various approaches.

A final set of radio buttons may be obtained, in one approach, by performing a pairwise comparison of all candidate radio buttons. The comparison may include: filtering the combined list of candidate radio buttons to remove candidates located within other candidate(s); combining intersecting candidates; and/or filtering out candidates that do not fit the overall image layout, singly or in any combination. Preferably, fitness to the overall image layout is indicated by degree of vertical and/or horizontal alignment between adjacent radio button candidates, and/or a Y coordinate of respective central point of candidate radio buttons being a value not less than 30 pixels.

At this point, in various embodiments it is preferable to assign the determined radio buttons into an existing tree-based data structure comprising previously detected elements. Determined radio buttons may be inserted/added into the existing tree structure, e.g. as described hereinabove immediately prior to the "Table Detection" section. Preferably the insertion/addition is performed such that candidate radio buttons elements belonging to different containers/elements do not affect each other in the numerous comparisons and filters described herein.

In further embodiments, one or more additional criteria/conditions may be used to further filter the combined list of candidate radio buttons. The additional criteria/conditions may include any singular criterion or combination of criteria selected from: an element being characterized by a central point having a Y coordinate value greater than or equal to 30 pixels (indicating presence in a likely text-containing candidate element of the application/interface); an element being characterized by a distance between X coordinates of respective central points of two candidate radio buttons of less than or equal to about 400 pixels (e.g. $|(x_1-x_2)|<=400$); and/or a radius of two candidate radio buttons being characterized by a difference of less than or equal to 2 pixels.

Most preferably, at least one of the following two conditions should also be satisfied. First, a distance $D_5$ measured between Y coordinates of central points of two respective candidates is less than or equal to about 3 pixels; and/or a distance $D_6$ measured between X coordinates of the central points of the two candidates is less than or equal to about 3 pixels, and a distance $D_7$ measured between Y coordinates of the central points of the two candidates is less than or equal to about 100 pixels.

In some approaches, candidate radio buttons not meeting one or more of these additional criteria may be filtered out of the set prior to defining the final set, and the remaining candidate radio buttons may be identified as radio buttons. The identified radio buttons are preferably defined within the tree-based data structure by inserting radio button elements and corresponding features (e.g. labels, position, etc. as described in further detail below) into corresponding container(s) of the image/interface as represented by the tree-based data structure.

Icon Detection

Turning now to icon detection, which is preferably performed following radio button detection, similar to the above-described radio button detection technique, icon detection includes rendering the image/interface 300 grayscale, and receiving a list of line candidates, and/or connected components with corresponding bounding boxes. In other words, the list is generated by rendering line candidates on a binary image and discovering connected components from the binary image. In any event, preferably the list of line candidates and/or connected components is filtered to remove candidate icon elements with a length greater than a predetermined maximum length threshold, as well as candidate icon element s with a length less than a predetermined minimum length threshold. The candidate icon element set is further filtered to remove candidate icon elements that correspond to previously identified elements, and candidate icon elements that have an aspect ratio outside a predetermined ratio, e.g. a ratio of in a range from about 0.8 to about 1.2, a ratio in a range from about 0.9 to about 1.1, or most preferably a ratio of about 1:1, according to embodiments assuming icons are substantially square in shape.

Of course, if icons are known to have a different shape, different ratios may be employed in a manner that would be understood by a person having ordinary skill in the art upon reading the present disclosure. For instance, rectangular elements may be filtered according to an expected aspect ratio, e.g. in a range from about 1:2 to about 1:4.

Various embodiments of icon detection may include additional features and/or operations, and/or omit certain steps listed below. For example, in one embodiment icon detection may leverage a contour detector substantially as described above regarding radio button detection in order to define/identify a set of candidate icon elements, but with slightly different parameters.

In a preferred implementation, icon detection proceeds substantially according to method 1200 as shown in FIG. 12. Again, in various embodiments icon detection according to method 1200 may optionally include contour detection. Moreover, method 1200 may be performed in any suitable environment, including but not limited to those shown in FIGS. 1-5F and 9A-9B, in various approaches. Moreover, the method 1200 may include more operations, functions, features, etc. than shown in FIG. 12, and/or may omit certain operations, functions, features, etc. shown in FIG. 12, according to various embodiments and without departing from the scope of the present disclosure.

In operation 1202, the input/original color rendering of the image/interface (typically RGB) is converted to grayscale.

A second operation 1204 includes applying a contour detector substantially as described hereinabove to the grayscale image to produce a binary image with edges represented by black pixels superimposed on a white background. The contour detector may employ a Canny edge detector, which may be applied via the OpenCV function OpenCV::Canny( ) in one embodiment, or using any other suitable technique known in the art at the time of the present application's priority date. In accordance with preferred icon detection implementations, parameters for the contour detector include: no blur, and for the function OpenCV::Canny( ) function, hysteresis threshold values are preferably defined according to a predetermined low hysteresis threshold and a predetermined high hysteresis threshold. In various embodiments, the low hysteresis threshold may be a value in a range from about 40 to about 75, a value in a range from about 50 to about 70, more preferably a value in a range from about 55 to about 65, and most preferably a value of about 60. Similarly, in various embodiments the high hysteresis threshold may be a value in a range from about 125 to about 175, preferably a value in a range from about 140 to about 160, more preferably a value in a range from about 145 to about 155 and most preferably a value of about 150.

In operation 1206, the binary image produced by Canny edge detection is analyzed and lines with length greater than a maximum icon length threshold (e.g. a value in a range from about 40 pixels to about 75 pixels, a value in a range from about 50 pixels to about 70 pixels, more preferably a value in a range from about 55 pixels to about 65 pixels, and most preferably a value of about 60 pixels) are removed from the set of candidate icon elements. In one embodiment, lines with length exceeding the maximum icon length threshold may be removed by replacing the corresponding black pixels thereof with white pixels in a rendering of the application image/interface.

According to the inventive embodiment depicted in FIG. 12, operation 1208 of method 1200 involves computing bounding boxes of remaining contours in the binary image, e.g., using OpenCV functions: OpenCV::findContours( ) followed by OpenCV::boundingRect( ) though other non-OpenCV implementations may be employed without departing from the scope of the present disclosure. In one embodiment, bounding boxes computed in operation 1208, and the corresponding contours, may be taken as the set of "icon elements" within the application image/interface.

In various exemplary embodiments, icon elements identified per operations 1202-1208 of method 1200 may be inserted/added into an existing, preferably tree-based, data structure including detected elements (whether candidate icon elements or otherwise), e.g. as described hereinabove immediately prior to the "Table Detection" section. Preferably the insertion/addition is performed such that candidate icon elements belonging to different containers/elements do not affect each other in the numerous comparisons and filters.

For instance, according to such optional implementations, candidate icon elements located inside previously detected elements of the type "table" are filtered out of the set so as to disallow allow icons to be a part of a table cells. Of course, this limitation is optional and the assumption that icons are never part of table cells is not necessarily applied in all approaches.

With continuing reference to optional filtering, candidate icon elements that have a width or height greater than about a predetermined icon maximum dimension threshold (e.g. a value in a range from about 40 pixels to about 75 pixels, a value in a range from about 50 pixels to about 70 pixels, more preferably a value in a range from about 55 pixels to about 65 pixels, and most preferably a value of about 60 pixels) may be removed from the set.

In addition, candidate icon elements that are wholly or partially located inside another candidate element may optionally be removed from the set.

Overlapping candidate icon elements may be combined, regardless of which optional filters are applied, in various approaches.

Once again, the (previously overlapping, now combined) candidate icon elements that are wholly or partially located inside another candidate element may optionally be removed from the set.

In another combination operation, "closely positioned" pairs of candidate icon elements may be combined where two conditions are satisfied. First, an X distance between the pair of candidate icon elements is less than or equal to a value in a range from about 1 pixel to about 5 pixels, preferably a value in a range from about 2 pixels to about 4 pixels, and most preferably a value of about 3 pixels. Second, a Y distance between candidates is less than or equal to a value in a range from about 0.1 pixels to about 2 pixels, preferably a range from about 0.5 pixels to about 1.5 pixels, and most preferably a value of about 1 pixel.

Now with continuing reference to icon detection per method 1200 and FIG. 12, in operation 1210, all candidate icon elements having a width or height less than a minimum icon length threshold (e.g. a value in a range from about 4 pixels to about 10 pixels, preferably a value in a range from about 5 pixels to about 8 pixels, and most preferably a value of about 6 pixels) are removed from the set via filtering.

In operation 1212, all candidate icon elements that overlap with, or otherwise correspond to previously identified elements (e.g. lines, check boxes, tables, radio buttons, etc. in various embodiments) are removed from the set.

Candidate icon elements or elements having text-like characteristics may be removed based on a filtering process performed in operation 1214. This filter identifies elements having a height less than or equal to a predetermined maximum text height threshold (e.g. a value in a range from about 15 pixels to about 35 pixels, preferably a value in a range from about 20 pixels to about 30 pixels, more preferably a value in a range from about 22 pixels to about 27 pixels, and most preferably a value of about 25 pixels); and/or an aspect ratio (W/H) greater than a predetermined minimum text aspect ratio (e.g. a value in a range from about 1.2 to about 2.8, preferably a value in a range from about 1.5 to about 2.5, more preferably a value in a range from about 1.8 to about 2.2, and most preferably a value of about 2.0).

Candidate icon elements identified by the filtering process of operation 1214 are considered "text-like" and may correspond to textual elements of the application image/interface, in some embodiments. These text-like elements are preferably retained in a separate list for further evaluation as described below with reference to "text element detection". The remaining candidate icon elements following this filtering step may be considered the final set of icon elements, according to some approaches.

In even more embodiments, the icon candidate elements may be still further filtered. One such further, optional, filtering operation involves removing candidate icon elements characterized by any one or combination of the following dimensions and/or characteristics: a width and/or height less than a predetermined minimum icon dimension threshold (e.g. a value in a range from about 8 pixels to about 16 pixels, preferably a value in a range from about 10 pixels to about 14 pixels, more preferably a value in a range from about 11 pixels to about 13 pixels, and most preferably a value of about 12 pixels); a width and/or height greater than a maximum icon dimension threshold (e.g. a value in a range from about 45 pixels to about 75 pixels, preferably a value in a range from about 50 pixels to about 70 pixels, more preferably a value in a range from about 55 pixels to about 65 pixels, and most preferably a value of about 60 pixels); an aspect ratio (W/H) less than a minimum icon aspect ratio threshold (e.g. a value in a range from about 0.25 to about 0.75, preferably a value in a range from about 0.4 to about 0.6, more preferably a value in a range from about 0.45 to about 0.55, and most preferably a value of about 0.5); and/or an aspect ratio (W/H) greater than a maximum icon aspect ratio threshold (e.g. a value in a range from about 1.5 to about 2.5, preferably a value in a range from about 1.75 to about 2.25, more preferably a value in a range from about 1.9 to about 2.1, and most preferably a value of about 2.0).

Another optional filtering operation, in several approaches, is preferably applied to exclude from the set of candidate icon elements those candidate icon elements that are the only candidate present in a given parent container. In other words, if a container only includes a single icon candidate, the icon candidate is preferably removed from the set of candidate icon elements.

Whether or not optional filtering operations above are applied, the remaining set of elements may be considered icon elements in operation 1216.

Text/Icon Discrimination Via Neural Network

In preferred approaches of the inventive intelligent screen automation concepts presented herein, icon and text detection/discrimination may involve additional processing of the data derived from application image/interface 300. In particular, since the set of icons may still include textual elements, optional yet further discrimination between textual elements and icons may be performed using a neural network, as described in further detail below.

Preferably, the probability cutoffs for icon detection are set such that text recall is maximized, even at the expense of icon recall. The reason for this preference is because text (even if nested within an icon and interpreted as text rather than an icon) is the most appropriate input to a subsequent text recognition operation. Feeding icons into text recognition produces, at best, is misinformative and so the inventive techniques presented herein maximize the recall rate of text.

Experimentally, neural network-based text detection as described below was performed using a training set of several hundred examples. The text recall rate was approximately 99.99%, while icon recall was approximately 50%. Again, false negative icon detection is preferred to false negative text detection, and so text detection is optimized.

In one experimental implementation, a training data set used to train a neural network included about 1000 test examples. As a result of training, the network produced the weight values (including bias) that are stored as constants and used in runtime for analysis of real examples.

To discriminate candidate/actual textual elements from candidate/actual icon elements, it is advantageous to define four features that describe icon elements. These features are preferably represented as numerical values.

A neural network having an input layer including, or in one embodiment consisting of, these feature values ("signals" in neural network terminology) is preferably implemented to discriminate between candidate/actual icon elements and candidate/actual textual elements. The input values may be summed with a vector of weights using a linear model (preferably, using one weight value per input value plus a bias), and the computed value is passed as input into a sigmoid activation function. The output of the activation function is a Boolean value indicating whether a candidate is an icon or not.

The first feature, referred to herein as a "number of colors" is implemented for icon detection/discrimination and utilizes the original color image/interface 300 as input, computing a color histogram therefor. For example, the image/interface 300 may have 256 colors/channels, which may be represented by 8 bins. The color histograms are computed using any suitable technique known in the art, for instance in one implementation using the OpenCV function calcHist( ) For example, in a typical RGB input image there are 256 colors per channel. These colors and channels are preferably divided to bins, yielding 8 bins per channel or 24 bins in total. For example:

bin1 ([0 . . . 31], [0 . . . 31], [0 . . . 31])
bin2 ([32 . . . 63], [0 . . . 31], [0 . . . 31])
bin3([0 . . . 31], [32 . . . 63], [0 . . . 31])
. . .
bin24([223 . . . 255], [223 . . . 255], [223 . . . 255])

Normalized values (which may be L1-normalized values, in one exemplary approach) in all 24 bins yield a sum value of 1.0. To obtain the normalized values, each value in each bin is divided by total number of pixels (w*h) of the candidate icon element.

A total number of bins with a value greater than a predetermined threshold of 0.1 (i.e. 10% of all pixels) is computed, and this normalized result is considered to be the "number of colors" feature for the candidate icon element. Importantly, the "number of colors" feature is indicative of the type of element, if any, present in the corresponding location of the image. Accordingly, this histogram building and normalization process may facilitate distinguishing icon elements from other similar elements such as text, in preferred approaches.

The second feature is referred to as a "color distance to surrounding area" feature, and is computed as follows. In addition to analyzing the color profile of a given candidate icon element, in some approaches it is advantageous to analyze a small area surrounding the candidate icon element using a similar color histogram analysis technique. The small area may include, for example, a candidate icon element and an area of about 2-4 pixels, preferably 2 pixels surrounding the boundary of the candidate icon element in each direction, in several approaches.

The normalized histogram of the candidate icon element (in accordance with the foregoing exemplary histogram and normalization, the normalized histogram has 4 bins instead of 8, 256 colors, 3 channels, and thus 12 bins in total) may then be compared to a corresponding normalized color histogram of the area around the candidate icon element. In one implementation, an_OpenCV::compareHist( ) method with "Chi-Square distance" type of distance may be utilized for the comparison, though other methods suitable for histogram comparison may be employed without departing from the scope of the instant disclosure.

The output of this comparison is taken as the value of the "color distance to surrounding area) value of the feature. The greater the value, the greater "color distance" between the candidate and the surrounding area. Generally, "color distance" for icons is greater than for textual elements, and thus this second feature also helps discriminate textual elements from icons.

To facilitate distinguishing icons from text, an "area of dilated image" feature may be evaluated. To do so, the candidate icon element may be binarized and subjected to a dilation operation (e.g. an OpenCV dilation, though other suitable techniques may be utilized). Before dilation, the candidate icon element may be stretched and/or extended by a value of about 1-2 pixels in each direction, according to one preferred embodiment.

Following dilation, the number of black pixels within the area of the extended candidate icon element are counted, and the number of black pixels is divided by total number of pixels within the area of the extended candidate icon element (e.g. width x height for a rectangular element). The value of the "area of dilated image" feature is taken as the area of black color on the dilated image (and the value is characterized by a range from 0.0-1.0, inclusive). The result may then be used as an input value (signal) for the neural network.

Finally, to even further facilitate discriminating text from candidate icon elements, a "minimum color distance to neighboring textual elements" feature may be evaluated. Preferably, the candidate textual elements are determined from the set of icon candidate icon elements, by identifying candidate elements located in a same parent container as a corresponding icon element. The candidate textual elements are provided as input to the neural network to evaluate this fourth feature. Color histograms (8 bins per channel, 3 channels) for each candidate textual element and for all neighboring textual elements (i.e. textual elements belonging to a same parent container as the icon candidate) are computed and normalized, e.g. using an OpenCV function and/or L1-normalization as described above.

Next, candidate textual element histograms are iteratively compared to corresponding histograms of each neighboring candidate textual element using a "Bhattacharyya distance" to find the minimal distance. This minimal distance is the result value for this feature (and is returned as input to the neural network). In general, the greater distance, the less similar the colors of the candidate are relative to colors of "known" textual elements in the container. From experimental data, icons often have greater distance values than textual elements, and may be discriminated on this basis.

The foregoing four features (signals) are fed as input to a neural network to discriminate textual elements from any remaining icon candidates. The network returns a Boolean value indicating if the candidate is icon or not. If the value indicates the candidate is an icon, we insert the corresponding icon element into corresponding parent container. Otherwise, the element is either treated as a textual element and a corresponding text element is inserted into the corresponding parent container, or more preferably the element is ignored, and textual element detection is performed substantially as described hereinbelow.

Further Textual Element Detection

Figure 13:
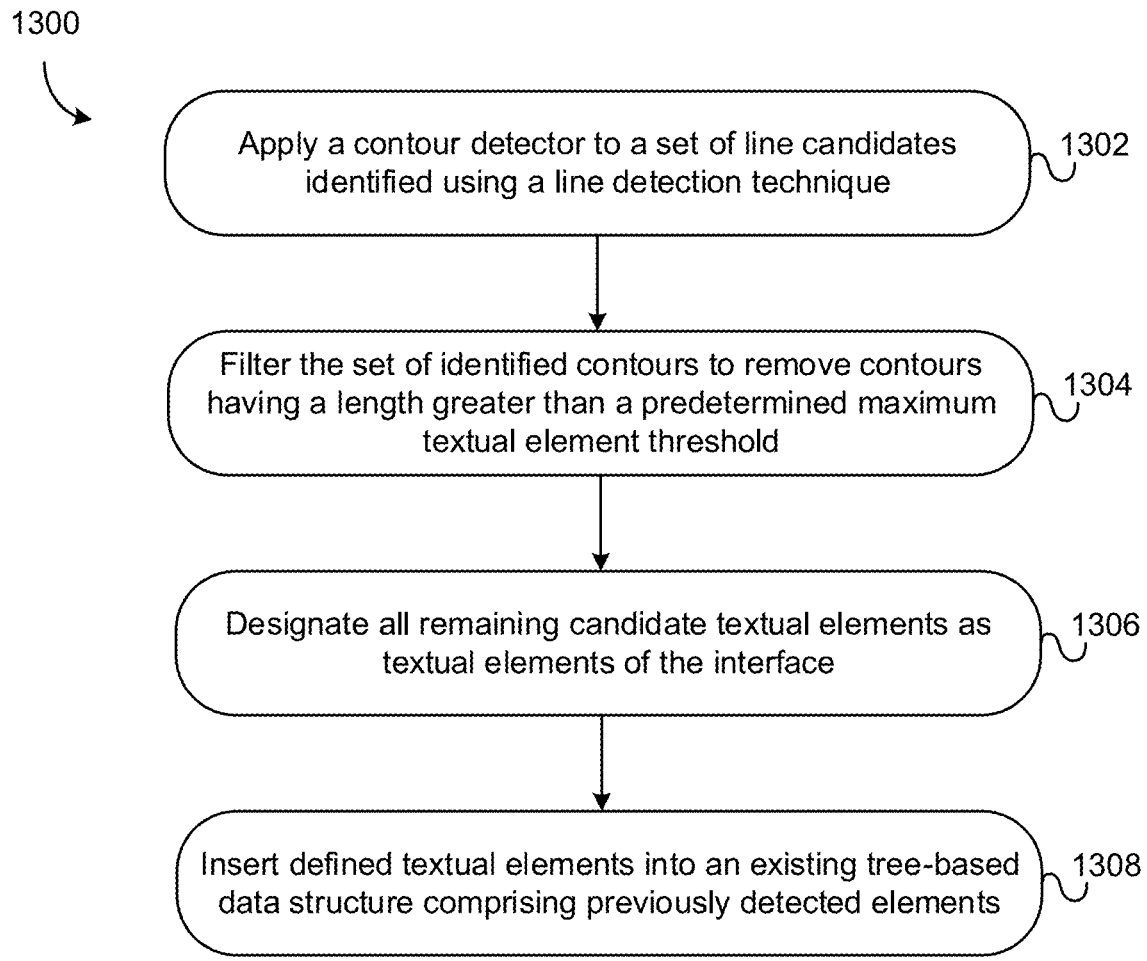
FIG. 13 is a flowchart of a method for discriminating textual elements from icons, and for detecting textual elements within an application interface, according to one embodiment.

While textual elements may be assumed to include the list of candidate icon elements filtered out of the final set, in preferred approaches textual element detection involves and/or includes an affirmative detection procedure as shown in FIG. 13 and described hereinbelow with reference to method 1300, in one exemplary embodiment.

In operation 1302, a contour detector (such as described hereinabove with respect to FIG. 11 and radio button detection method 1100) is applied to a set of line candidates (which may be, and preferably are, identified as described hereinabove regarding FIG. 7 and line detection/identification method 700). Parameters for the contour detector in this textual element detection phase include using: Gaussian blur, a low hysteresis threshold for OpenCV::Canny( ) in a range from about 80 to about 120, preferably a range from about 90 to about 110, and most preferably a value of about 100; and/or a high hysteresis threshold for OpenCV::Canny( ) in a range in a range from about 225 to about 275, more preferably a range from about 240 to about 260, and most preferably a value of about 250 (high).

Operation 1304 of method 1300 involves filtering candidate textual elements having a length greater than a maximum textual element length threshold from the set. The maximum length threshold, in various embodiments, may be a value in a range from about 15-25 pixels, preferably in a range from about 18-22 pixels, and most preferably a value of about 20 pixels. Candidate textual elements remaining in the set following this filtration process may be defined as "textual elements" of the application image/interface, in operation 1306 and in accordance with several embodiments.

Operation 1306 involves inserting/adding the textual elements into an existing tree structure including previously detected elements (whether textual elements or otherwise, and preferably including at least check boxes, tables, generic rectangular elements, icons, and radio buttons), e.g. as described hereinabove immediately prior to the "Table Detection" section. Preferably the insertion/addition is performed such that candidate textual elements belonging to different containers/elements do not affect each other in the numerous comparisons and filters. The tree structure may be, and ideally is, extended every time new candidate textual elements are identified.

While textual elements may be defined in the output of operation 1306, in particularly preferred approaches, one or more of several optional filters may additionally be applied in the context of method 1300 to filter out likely false positive candidate textual elements. For example, a first optional filter may remove candidate textual elements that have height greater than a maximum height threshold. In various approaches, the maximum height threshold may be a value in a range from about 20 pixels to about 30 pixels, a value in a range from about 22 pixels to about 28 pixels, and most preferably a value of about 25 pixels. Of course, other values may be employed in various embodiments, e.g. where font size is expected to deviate from typical norms (e.g. size of 10-14 point, using standard business fonts such as Times New Roman, Arial, etc.)

A second optional filter for textual element detection seeks to identify candidate textual elements within tables, and eliminate candidate textual elements overlapping multiple cells of a table. Candidate textual elements whose position falls within the position of a parent container of the type "table" are identified. Next, the position of the candidate textual element is evaluated with respect to the location of all cells previously determined to exist within the table. If the position of the candidate textual element overlaps/lies partially within multiple cells, the candidate textual element is removed from the set. On the other hand, if the position of the candidate textual element lies wholly within a single cell, the candidate textual element is retained. This second optional filter may be applied iteratively over all cells, and all candidate textual elements identified within any given cell are preferably combined into a single candidate textual element for further evaluation. These candidate textual elements are defined as textual elements of the image/interface. Moreover, all cells are characterized by a binary condition of either containing a candidate textual element, or not containing any textual elements.

To facilitate detection of textual elements not located within a cell of a table, which often represent letters, words or noise, the following procedure may be employed, in various approaches.

First, letters are combined into words. In order to combine letters into words, closely positioned pairs of candidate textual elements may be combined based on relative distance, size, and/or positional overlap substantially as follows.

For each pair of candidate textual elements: if an X-coordinate distance between the candidate textual elements is less than or equal to a text X-distance threshold (e.g. a value in a range from about 0.5 pixels to about 1.5 pixels, a value in a range from about 0.75 pixels to about 1.25 pixels, or a value of about 1 pixel, in different embodiments); a Y-coordinate distance between the candidate textual elements is less than or equal to a text Y-distance threshold (e.g. a value in a range from about 0.5 pixels to about 1.5 pixels, a value in a range from about 0.75 pixels to about 1.25 pixels, or a value of about 1 pixel, in different embodiments); and a height of both the candidate textual elements is less than a maximum height threshold (e.g. a value in a range from about 3 pixels to about 9 pixels, a value in a range from about 5 pixels to about 7 pixels, or a value of about 6 pixels, in different embodiments); the candidate textual elements are combined.

Further, candidate textual elements having wholly or partially overlapping positions may be combined.

This word-building process is preferably repeated pairwise for all candidate textual elements, and may be performed iteratively to ensure all previously-combined candidate textual elements are combined with further textual elements, as appropriate.

A second operation for detection of textual elements located outside tables includes combining words into sentences. Preferably, words are combined into sentences based on positional proximity. To do so, a font height for each pair of candidate textual elements may be set as the minimum font height of the two candidate textual elements.

If the minimum font height of the pair of candidate textual elements is less than a minimum height threshold, (e.g. a value in a range from about 3 pixels to about 9 pixels, a value in a range from about 5 pixels to about 7 pixels, or a value of about 6 pixels, in different embodiments), the font height for the pair of candidate textual elements is set to the value of the minimum height threshold.

On the other hand, if the font height of the pair of candidate textual elements is greater than a maximum height threshold, (e.g. a value in a range from about 20 pixels to about 30 pixels, a value in a range from about 22 pixels to about 28 pixels, or a value of about 25 pixels, in different embodiments), the font height for the pair of candidate textual elements is set to the maximum height threshold.

Depending on the font height values as set above, a maximum X-coordinate distance between candidate textual elements is defined according to an array of max distances for candidate textual element minimum font heights falling between the minimum and maximum height thresholds. For instance, in one embodiment the array of max distances for a minimum height threshold of 6 pixels and a maximum height threshold of 25 pixels was [8, 8, 8, 8, 9, 9, 10, 10, 11, 11, 12, 12, 13, 14, 14, 15, 16, 16, 17, 18].

If an X-coordinate distance between a right side of the "left-most" of the pair of candidate textual elements, and an X-coordinate of the left side of the "right-most" of the pair of candidate textual elements is less than or equal to the maximum X-coordinate distance described above, and a Y-coordinate distance between respective center points of the candidate textual elements less than or equal to the minimum font height determined for the pair of candidate textual elements, the pair of candidate textual elements are defined as belonging to the same sentence (or equivalently, the same multi-word textual element) and the candidates are combined.

After combining letters into words, and/or combining words into sentences, a filtering operation may be performed to filter out candidate textual elements that have a width and/or height less than the minimum height threshold, and/or to filter out candidate textual elements that have a width and/or height greater than the maximum height threshold.

Preferably, all remaining candidate textual elements are defined as textual elements.

Label Detection

The next step in the overall image processing/detection process attempts to understand which text candidate elements can be area labels of elements, e.g. text boxes and icons and check boxes and radio buttons within a given container. Throughout the container, the positions of elements are evaluated to generate a single set of possible links and labels, while a second set of elements that can have labels are scored in pairwise fashion. The scores are evaluated to determine which label candidate and element pair has the minimum score and if this minimum score is sufficiently small, the corresponding text candidate element is designated an area label for the respective element and a special relation between these two objects is designated in the tree structure describing the image/interface.

Building Models for Automated Script/Entity Interaction with Processed Images/Interfaces Preferably, the output of the foregoing analyses is a data structure describing the image/interface 300 and corresponding elements and associated functions in a language/format/etc. comprehensible by an automated script to facilitate automated interaction with similar or same images/interfaces 300; In a particularly preferred implementation, the output is an XML file reflecting a tree structure of the various elements and corresponding functions, descriptions, etc. This output may be provided in combination with the image/interface to facilitate building an automated script/entity configured to interact with the image/interface.

Several exemplary embodiments of such a tree structure are shown in FIGS. 5A-5F. These tree structures and interfaces should be understood as illustrative only, not limiting on the scope of the presently disclosed inventive concepts.

For instance, the tree structure may include designation of various elements, as well as the corresponding location (e.g. x, y coordinates) of one or more corners/vertices of the respective element or associated bounding box, corresponding aspect ratio of the element and/or bounding box, etc.; a label associated with the element (e.g. an associated descriptive textual element, and/or simply a metadata descriptor of the element); a function associated with the element or call to the function associated with the element, a logical structure (e.g. nesting or hierarchical level and associated elements of other levels of the hierarchy) of the element within the overall tree structure, etc. as would be understood by a person having ordinary skill in the art upon reading the present descriptions.

Each element has attributes, for instance attributes of text may include: the coordinates and size of the element (e.g. der_x, der_y, der_width, der_height as shown in FIGS. 5A-5F); diagonal values, e.g. lengths/coordinates calculated relative to the element's top left and bottom right coordinates (e.g. lt_16_5, rb_15_4 as shown in FIGS. 5A-5F), description of the element (e.g. element type); element label (e.g. value of a textual element associated with the element); element name (e.g. value of a textual element); etc. as shown in FIGS. 5A-5F and equivalents thereof that would be appreciated by a person having ordinary skill in the art upon reading the present descriptions.

While the present descriptions have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Similarly, a computer program product within the scope of the present descriptions may include a computer readable storage medium having program code embodied therewith, the program code readable/executable by a processor to cause the processor to perform steps of a method as described herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

Accordingly, one embodiment of the present invention includes all of the features disclosed herein, including those shown and described in conjunction with any of the FIGS. Other embodiments include subsets of the features disclosed herein and/or shown and described in conjunction with any of the FIGS. Such features, or subsets thereof, may be combined in any way using known techniques that would become apparent to one skilled in the art after reading the present description.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product for determining functional and descriptive elements of application and interface images includes a computer readable medium having program instructions embodied therewith, the program instructions configured to cause a computer, upon execution thereof, to perform a method comprising:

identifying, from among a plurality of elements within one or more images of a user interface, a first set of elements and a second set of elements, wherein the first set of elements and the second set of elements each independently comprise either or both of: textual elements, and non-textual elements;

determining one or more logical relationships between the textual elements and the non-textual elements;

building a hierarchy comprising some or all of the first set of elements and some or all of the second set of elements, wherein building the hierarchy forms a data structure representing functionality of the user interface; and outputting the data structure to a memory.

2. The computer program product as recited in claim 1, wherein identifying the first set of elements comprises sequentially searching for different types of elements within some or all of the one or more images, wherein the sequential search comprises:

line detection;
check box detection;
rectangular element detection; and
table detection.

3. The computer program product as recited in claim 2, wherein line detection comprises:

converting some or all of the one or more images from a standard color space to a Lab color space;

determining a Euclidean distance between components L, a, and b for a plurality of adjacent pixels within some or all of the one or more images;

comparing the Euclidean distance for each pair of adjacent pixels to a minimum distance threshold; and at least partially in response to determining the Euclidean distance for a given pair of adjacent pixels is greater than the minimum distance threshold, designating the pair of adjacent pixels as a candidate line location.

4. The computer program product as recited in claim 3, wherein the Euclidean distance is calculated for horizontally adjacent pixels within some or all of the one or more images and for vertically adjacent pixels within the some or all of the one or more images.

5. The computer program product as recited in claim 2, wherein check box detection comprises:

receiving a set of candidate line elements derived from the one or more images;

searching for intersecting candidate line elements among the set of candidate line elements; and designating as check boxes intersecting lines forming a substantially square shape within a square candidate element of one of the one or more images, wherein the square candidate element is characterized by a length from about 10 pixels to about 18 pixels.

6. The computer program product as recited in claim 5, wherein check box detection further comprises:

filtering the set of line candidates to generate a filtered set of line candidates, wherein the filtered set of line candidates excludes:
lines having a length less than 10 pixels; and
lines having a length greater than about 18 pixels;

combining neighboring lines from among the filtered set of line candidates to generate a filtered set of combined line candidates;

searching for intersecting lines among the filtered set of combined line candidates to identify a set of candidate rectangles;

computing an aspect ratio of each candidate rectangle; and designating as check boxes each set of candidate rectangle having an aspect ratio from about 0.9 to about 1.14.

7. The computer program product as recited in claim 2, wherein table detection comprises:

computing an area of each of a plurality of candidate rectangles derived from some or all of the one or more images;

sorting the plurality of candidate rectangles according to descending area;

determining whether each candidate rectangle comprises multiple candidate rows, each candidate row having a same width as the candidate rectangle and a lesser height than the candidate rectangle;

in response to determining a given candidate rectangle comprises multiple candidate rows:
identifying all inner rectangles within the given candidate rectangle;
determining an X-coordinate value for each of the inner rectangles;
comparing the X-coordinate values for each row of the inner rectangles to X-coordinate values for a topmost row of the inner rectangles; and
defining a table element in the data structure in response to determining the X-coordinate values for at least one row of the inner rectangles match the X-coordinate values for the topmost row of the inner rectangles.

8. The computer program product as recited in claim 2, wherein for each step of the sequential search, elements identified within the one or more images during a prior step of the sequential search are excluded from a current step of the sequential search.

9. The computer program product as recited in claim 1, wherein identifying the second set of elements comprises sequentially searching for different types of elements within some or all of the one or more images, wherein the sequential search comprises:

radio button detection;
icon detection; and
textual element detection.

10. The computer program product as recited in claim 9, wherein radio button detection comprises:

reducing color depth of the some of all of the one or more images to generate grayscale rendering(s) of some or all of the one or more images;

blurring the grayscale rendering(s) of the some or all of the one or more images to generate blurred grayscale rendering(s) of the some or all of the one or more images;

detecting a set of candidate edges within the blurred grayscale rendering(s) of the some or all of the one or more images;

filtering the set of candidate edges to generate a filtered set of candidate edges, wherein the filtered set of candidate edges excludes candidate edges having a length greater than a predetermined maximum length threshold;

identifying a set of contours within:
the filtered set of candidate edges; and/or
a set of bounding boxes, each bounding box corresponding to at least one candidate edge within the filtered set of candidate edges;

generating an expanded set of bounding boxes by expanding an area of some or all of the bounding boxes in the set of bounding boxes by one pixel in each cardinal direction;

combining overlapping ones of the expanded set of bounding boxes;

generating a shrunken set of bounding boxes by shrinking the area of some or all of the bounding boxes in the set of bounding boxes by one pixel in each cardinal direction;

computing an aspect ratio of some or all of the bounding boxes in:
  the set of bounding boxes;
  the expanded set of bounding boxes; and/or
  the shrunken set of bounding boxes;

forming a first filtered set of bounding boxes by:
  removing, from the set of bounding boxes, the expanded set of bounding boxes, and/or the shrunken set of bounding boxes, any bounding box having an aspect ratio less than about 0.9;
  removing, from the set of bounding boxes, the expanded set of bounding boxes, and/or the shrunken set of bounding boxes, any bounding box having an aspect ratio greater than about 1.1;
  removing from the set of bounding boxes, the expanded set of bounding boxes, and/or the shrunken set of bounding boxes, any bounding box having a height less than a predetermined minimum height threshold; and/or
  removing, from the set of bounding boxes, the expanded set of bounding boxes, and/or the shrunken set of bounding boxes, any bounding box having a height greater than a predetermined maximum height threshold; and estimating a radius of bounding boxes in the first filtered set of bounding boxes;

determining, within a six-pixel window of a length of the estimated radius of some or all of the bounding boxes in the first filtered set of bounding boxes, a black pixel count corresponding to the some or all of the bounding boxes in the first filtered set of bounding boxes;

generating a second filtered set of bounding boxes by removing, from the first filtered set bounding boxes, any bounding box having a black pixel count to radius ratio having a value less than about 5.8; and designating bounding boxes in the second filtered set of bounding boxes as candidate radio buttons.

11. The computer program product as recited in claim 9, wherein icon detection comprises:
  reducing color depth of some or all of the one or more images to generate one or more grayscale renderings of the some or all of the one or more images;
  blurring some or all of the one or more grayscale renderings of the some or all of the one or more images to generate a set of blurred grayscale renderings of the some or all of the one or more images;
  detecting a set of candidate edges within the set of blurred grayscale renderings;
  generating a filtered set of candidate edges by removing, from the set of candidate edges, candidate edges having a length greater than a predetermined maximum length threshold;
  computing a set of bounding boxes corresponding to some or all of the filtered set of candidate edges;
  removing, from the set of bounding boxes, any bounding box corresponding to a previously-identified element;

generating a set of combined bounding boxes by combining proximate, adjacent bounding boxes within the set of bounding boxes;

generating a filtered set of bounding boxes by:
  removing from the set of combined bounding boxes any bounding box(es) having a height less than a predetermined minimum height threshold, and/or a width less than a predetermined minimum width threshold;
  removing from the set of combined bounding boxes any bounding box having an aspect ratio greater than a predetermined maximum aspect ratio threshold; and
  removing from the set of combined bounding boxes any bounding box having an aspect ratio less than a predetermined minimum aspect ratio threshold; and designating one or more bounding boxes in the filtered set of bounding boxes as candidate icons.

12. The computer program product as recited in claim 9, wherein radio button detection and icon detection each independently comprise detecting contours.

13. The computer program product as recited in claim 12, wherein detecting contours for radio button detection comprises:
  applying a Gaussian blur with a kernel size of about 3×3;
  a high hysteresis threshold in a range from about 80 to about 100; and
  a low hysteresis threshold in a range from about 20 to about 40.

14. The computer program product as recited in claim 13, wherein radio button detection is performed iteratively;
  wherein detecting contours in a second iteration of the radio button detection comprises:
    applying a standard blur with a kernel size of about 3×3; and
    applying a test ratio of about 5.15; and
  wherein detecting contours in a third iteration of the radio button detection comprises:
    not applying any blur; and
    applying a test ratio of about 7.5.

15. The computer program product as recited in claim 12, wherein detecting contours for icon detection comprises:
  not applying any blur;
  a high hysteresis threshold in a range from about 40 to about 75; and
  a low hysteresis threshold in a range from about 125 to about 175.

16. The computer program product as recited in claim 9, wherein textual element detection comprises distinguishing some or all of the textual elements from icons using a neural network.

17. The computer program product as recited in claim 16, wherein distinguishing some or all of the textual elements from the icons using the neural network is based at least in part on one or more features selected from the group consisting of: a number of colors feature, a color distance to surrounding area feature, an area of dilated image feature, a minimum color distance to neighboring textual elements feature, and combinations thereof.

18. The computer program product as recited in claim 1, wherein determining the one or more logical relationships between the textual elements and the non-textual elements comprises detecting a plurality of labels, each label independently corresponding to:
  one or more of the textual elements; and/or
  one or more of the non-textual elements.

19. The computer program product as recited in claim 1, wherein the data structure identifies: some or all of the plurality of elements;
- an (x, y) coordinate location of:
  - one or more vertices of some or all of the plurality of elements; and/or
  - one or more vertices of one or more bounding boxes, each bounding box corresponding to one of the plurality of elements;
- an aspect ratio of:
  - some or all of the plurality of elements; and/or
  - some or all of the one or more bounding boxes;
- a label of some or all of the plurality of elements; and
- a logical structure of some or all of the plurality of elements.

20. The computer program product as recited in claim 1, further comprising computer program instructions configured to cause the computer, upon execution thereof, to filter the first set of elements to remove elements that:
- duplicate a root container of the data structure;
- are adjacent to another element;
- adjoin another element;
- are an invalid container elements; and/or
- conflict with another element.

\* \* \* \* \*